United States Patent
Kamitani et al.

(10) Patent No.: US 7,082,499 B2
(45) Date of Patent: Jul. 25, 2006

(54) EXTERNAL MEMORY CONTROL DEVICE REGULARLY READING AHEAD DATA FROM EXTERNAL MEMORY FOR STORAGE IN CACHE MEMORY, AND DATA DRIVEN TYPE INFORMATION PROCESSING APPARATUS INCLUDING THE SAME

(75) Inventors: Shingo Kamitani, Tenri (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 449 days.

(21) Appl. No.: 10/262,940

(22) Filed: Oct. 3, 2002

(65) Prior Publication Data

US 2003/0065889 A1 Apr. 3, 2003

(30) Foreign Application Priority Data

Oct. 3, 2001 (JP) .............................. 2001-307826

(51) Int. Cl.
*G06F 12/00* (2006.01)
(52) U.S. Cl. ........................ 711/137; 711/137; 712/207
(58) Field of Classification Search ................ 711/137; 712/207
See application file for complete search history.

(56) References Cited

U.S. PATENT DOCUMENTS

| 5,956,517 | A | 9/1999 | Okamoto et al. |
| 6,272,590 | B1* | 8/2001 | Riedle ........................ 711/113 |
| 6,594,711 | B1* | 7/2003 | Anderson et al. ............. 710/22 |
| 6,594,731 | B1* | 7/2003 | Hertwig et al. ............. 711/137 |
| 6,701,413 | B1* | 3/2004 | Shirai et al. ................. 711/137 |
| 6,760,818 | B1* | 7/2004 | van de Waerdt ............ 711/137 |
| 6,848,029 | B1* | 1/2005 | Coldewey .................... 711/137 |
| 2003/0163649 | A1* | 8/2003 | Kapur et al. ................. 711/146 |

FOREIGN PATENT DOCUMENTS

JP 8-287038 A 11/1996

* cited by examiner

*Primary Examiner*—Kevin Verbrugge
*Assistant Examiner*—Mehdi Namazi
(74) *Attorney, Agent, or Firm*—Birch, Stewart, Kolasch & Birch, LLP

(57) ABSTRACT

When the cache memory unit reads the last word of a page of the cache memory, the external memory interface reads ahead data of a prescribed number of pages ahead of the relevant page. Thus, data corresponding to the access request to the external main memory is always held in the cache memory. This prevents degradation of parallel processing capability of the data driven type information processing apparatus.

16 Claims, 28 Drawing Sheets

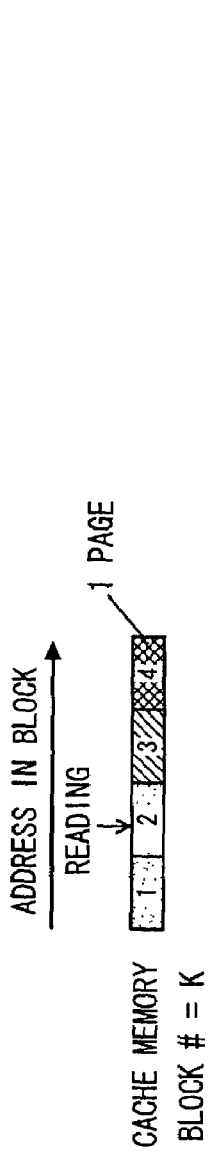
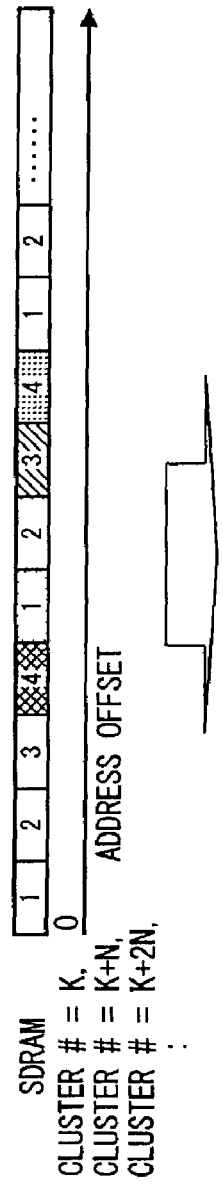
FIG. 13A
FIG. 13B
FIG. 13C

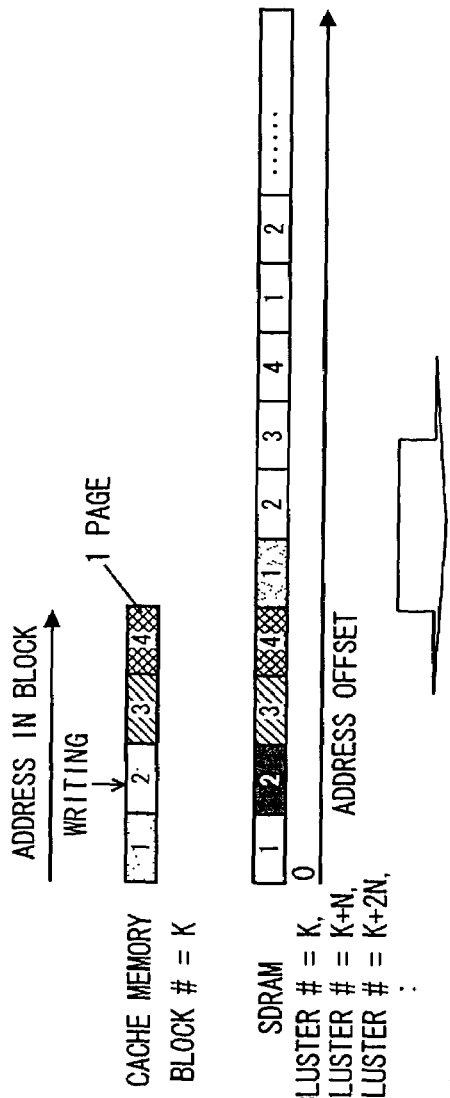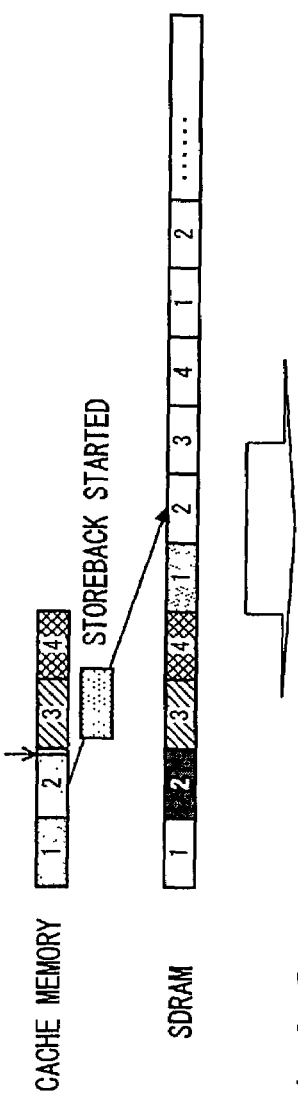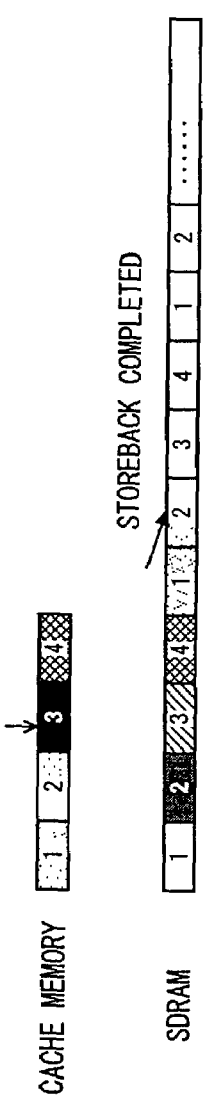

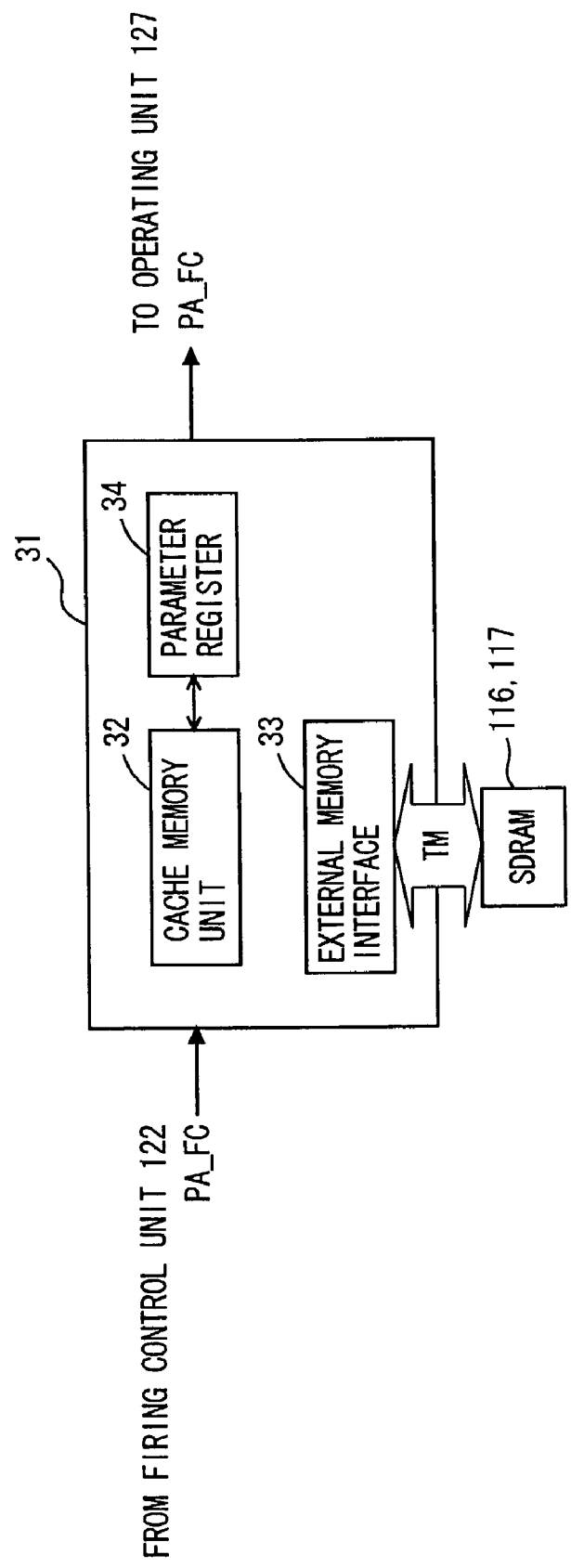
F I G. 15

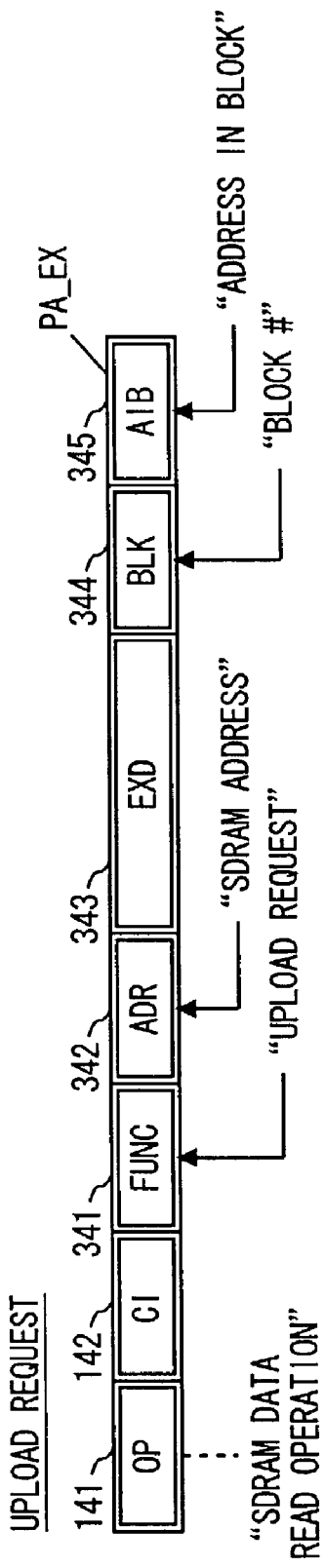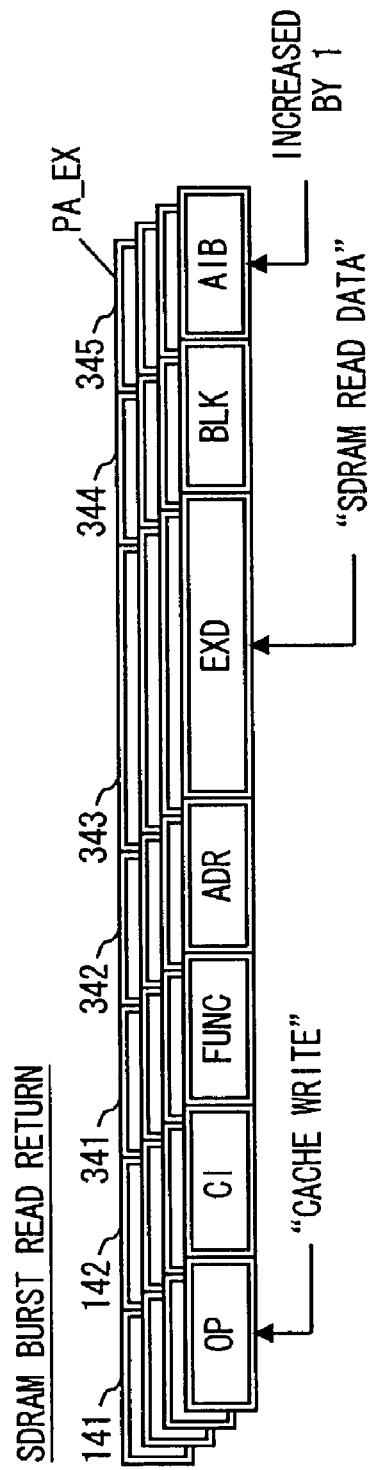

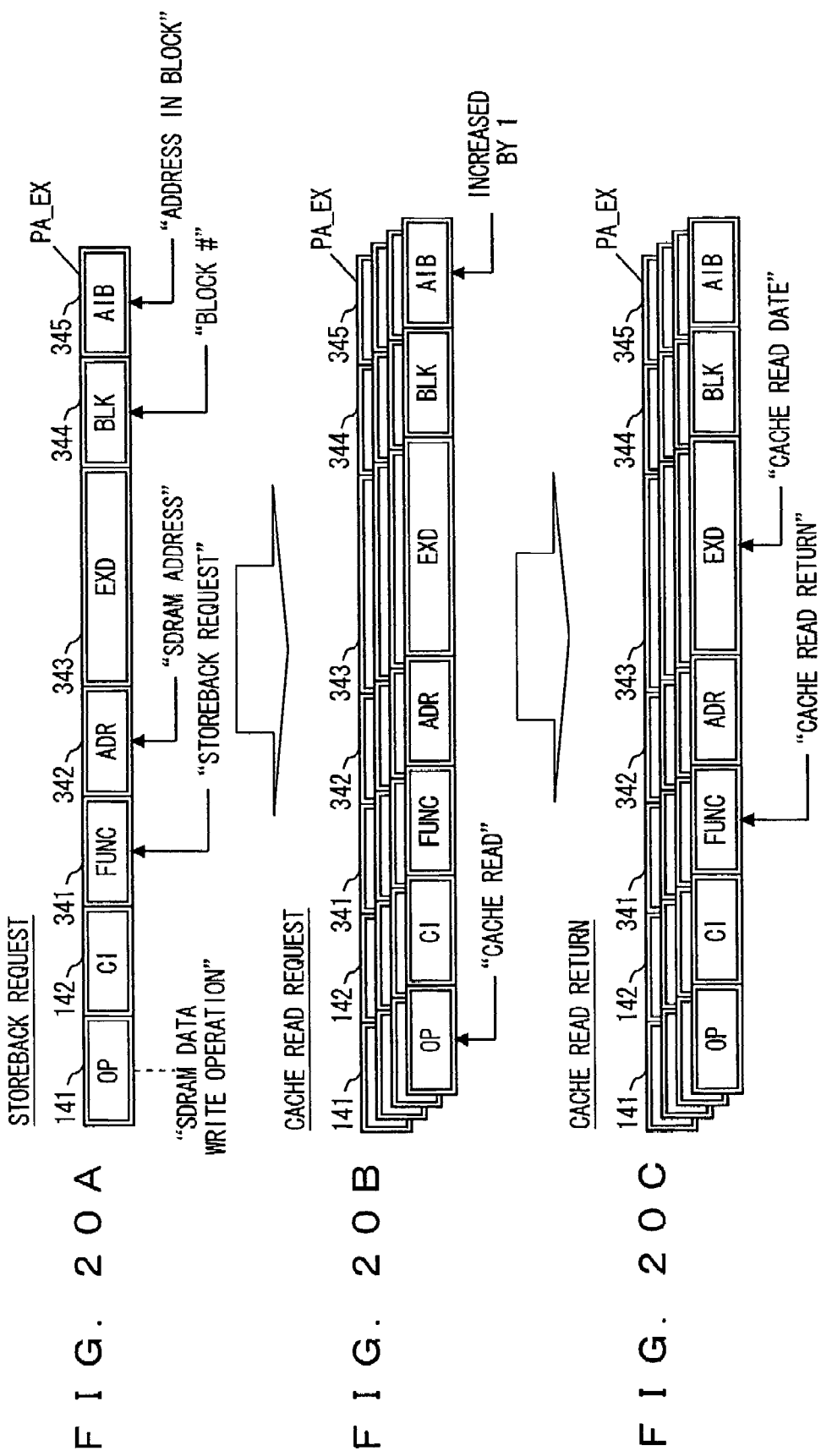

EXTERNAL MEMORY CONTROL DEVICE REGULARLY READING AHEAD DATA FROM EXTERNAL MEMORY FOR STORAGE IN CACHE MEMORY, AND DATA DRIVEN TYPE INFORMATION PROCESSING APPARATUS INCLUDING THE SAME

BACKGROUND OF THE INVENTION

1. Field of the Invention

The present invention relates to a technique to control an external memory in a data driven type information processing apparatus, and more particularly, to an external memory control device permitting efficient data access to an external memory and deriving parallel processing capability of a data driven type information processing apparatus upon execution of operations to the fullest extent, and a data driven type information processing apparatus including the same.

2. Description of the Background Art

In recent years, there has been an increasing demand for improved processor performance in a variety of fields requiring high-speed processing of a large amount of data such as multimedia processing and high-definition image processing. With the current LSI (Large Scale Integrated circuit) manufacturing techniques, however, there is a limit for speeding of devices. Thus, parallel processing has attracted attention, and research and development concerning the parallel processing have vigorously been made.

Among the computer architectures suitable for the parallel processing, a data driven type architectures has attracted the most attention. In a data driven type processing method, processing proceeds in parallel in accordance with a rule that "processing is executed once input data necessary for the relevant processing have all become available and the resources including operating devices necessary for the processing have been allocated".

FIG. 1 is a block diagram showing a schematic configuration of a conventional data driven type information processing system. This data driven type information processing system includes a data driven type information processing apparatus (hereinafter, "data driven information processor") 101 and an external memory 102 which stores data processed by data driven information processor 101 and others.

Data driven information processor 101 is provided with input ports IA and IB connected with data transmission paths 103 and 104, respectively, output ports OA and OB connected with data transmission paths 105 and 106, respectively, and an external memory port TM connected with an access control line 107.

Data driven information processor 101 receives packets PA_IO, which will be described later, from input ports IA and IB via data transmission paths 103 and 104 in time series. Data driven information processor 101 prestores prescribed processing contents as programs within, and processes the input packets PA_IO in accordance with the program contents.

External memory 102, in receipt of an access request signal from external memory port TM of data driven information processor 101 via access control line 107, performs an access according to the access request and acknowledges the access request to data driven information processor 101.

After completion of processing of input packet PA_IO, data driven information processor 101 outputs the packet PA_IO including processed contents via output port OA and data transmission path 105, or via output port OB and data transmission path 106.

FIGS. 2A–2C illustrate packets used in data driven information processor 101. FIG. 2A shows a basic configuration of the input/output packet PA_IO of data driven information processor 101. Input/output packet PA_IO includes a field 140 storing a processor number PE (Processor Element), a field 142 storing a core number CI, a field 143 storing a node number ND, a field 144 storing a color CL, and a field 145 storing data D.

Processor number PE is an indicator which identifies, in a system having a plurality of data driven information processors connected thereto, the data driven information processor in which the relevant packet PA_IO is to be processed. Core number CI is an indicator which identifies a processing core within data driven information processor 101, which will be described later.

Node number ND is used as an address for accessing contents stored in a constant memory and a program memory, which will be described later. Color CL is an identifier for uniquely recognizing each packet being input to data driven information processor 101 in time series. Color CL is used for calculation or save of memory addresses in a built-in memory control unit and an external memory control unit, which will be described later. Data D is data to be processed by data driven information processor 101.

FIG. 2B shows a basic configuration of a packet PA_RT which is generated inside data driven information processor 101. Packet PA_RT, generated in an input/output control unit as will be described later, is identical to packet PA_IO except that it has a field 141 storing an instruction code OP replacing the field 140 storing the PE number of packet PA_IO. Instruction OP determines a kind of operation to be performed on data D.

FIG. 2C shows a basic configuration of a packet PA_FC which is generated inside data driven information processor 101. Packet PA_FC, generated in a firing control unit as will be described later, is identical to packet PA_RT except that it has a field 146 storing left data LD and a field 147 storing right data RD in place of the field 145 storing data D in packet PA_RT.

FIG. 3 is a block diagram showing schematic configurations of data driven information processor 101 and external memory 102. Data driven information processor 101 includes: a plurality of processing cores 110 and 111 connected to external memory 102 via external memory port TM; processing cores 112 and 113 not connected to external memory 102; a main router 114, and an input/output control unit 115. External memory 102 includes SDRAM (Synchronous Dynamic Random Access Memories) 116 and 117 connected to processing cores 110 and 111, respectively, via external memory port TM.

When a packet PA_IO is applied via data transmission path 103 or 104 to the data driven information processor designated by processor number PE, input/output control unit 115 inputs the packet PA_IO via input port IA or IB, and generates a packet PA_RT from the relevant packet PA_IO. Specifically, input/output control unit 115 discards the processor number PE of packet PA_IO, acquires an instruction code OP and a new node number ND based on the node number ND of packet PA_IO, and stores them in the fields 141 and 143, respectively, of packet PA_RT. Input/output control unit 115 then sends the generated packet PA_RT to main router 114. Core number CI, color CL and data D are remained unchanged in input/output control unit 115.

Main router 114 selects a next destination of packet PA_RT referring to core number CI thereof, and sends the packet PA_RT to the destination. The field 142 for storage of core number CI stores a number indicating any of processing cores 110–113 and input/output control unit 115, so that the destination can be determined by referring to core number CI.

When main router 114 receives a packet PA_RT generated by any of processing cores 110–113 and storing processed data, it sends the packet PA_RT to input/output control unit 115. Input/output control unit 115, in receipt of packet PA_RT, decodes instruction code OP and node number ND of packet PA_RT, and determines whether a next instruction is to be executed within the relevant data driven information processor 101 or it should be executed in an external data driven information processor.

When determining that it should be executed by an external data driven information processor, input/output control unit 115 generates a packet PA_IO, as shown in FIG. 2A, with the PE number of the external data driven information processor stored in the field 140 for storage of PE number, and sends out the packet PA_IO via output port OA or OB.

On the other hand, if it determines that it should be executed in the relevant data driven information processor 101, input/output control unit 115 sends the packet PA_RT again to main router 114, with the contents of all the fields thereof remained unchanged.

FIG. 4 is a block diagram showing a schematic configuration of processing cores 110, 111. Processing cores 110 and 111 each include: an external memory control unit 121 connected to external memory port TM; a firing control unit 122 which receives packet PA_RT from main router 114; a branch unit 123; a built-in memory control unit 124; a built-in memory 125; a merge unit 126; an operating unit 127; and a program storing unit 128 which sends the processed packet PA_RT to main router 114.

Firing control unit 122 includes a constant memory 131 storing a constant necessary for performing data driven type processing, and a queuing memory 132 used for queuing of packets. Program storing unit 128 includes a program memory 133 storing a program necessary for performing the data driven type processing.

Firing control unit 122, in receipt of packet PA_RT from main router 114, detects constant data or a packet PA_RT making a pair with the relevant packet PA_RT. The packet PA_RT to be paired is detected by match of both node number ND and color CL thereof. If the matching packet PA_RT is not detected, firing control unit 122 temporarily stores packet PA_RT in queuing memory 132 for queuing. That the packet PA_RT to be paired is detected is called "firing".

Firing control unit 122, upon detection of paired packets PA_RT, stores data D having been stored in field 145 of one packet PA_RT in a packet PA_FC as shown in FIG. 2C in its field 146 for storage of left data LD, and stores data D having been stored in field 145 of the other packet PA_RT in the packet PA_FC in its field 147 for storage of right data RD. Firing control unit 122 sends packet PA_FC thus generated to branch unit 123. The other packet PA_RT is erased at this time.

If the data to be operated together is not a packet PA_RT but constant data, firing control unit 122 reads constant data from constant memory 131, and stores it in one of the fields 146 and 147 of packet PA_FC shown in FIG. 2C, and stores data D of packet PA_RT in the other of the fields 146 and 147. It sends packet PA_FC thus generated to branch unit 123.

Branch unit 123, in receipt of packet PA_FC from firing control unit 122, decodes instruction code OP of packet PA_FC and selects either one of built-in memory control unit 124 and external memory control unit 121 to send the packet PA_FC. Branch unit 123 sends the received packet PA_FC, with the contents of all the fields 141–144, 146 and 147 remained unchanged, to built-in memory control unit 124 or external memory control unit 121.

Built-in memory control unit 124, in receipt of packet PA_FC from branch unit 123, decodes instruction code OP of packet PA_FC, and executes prescribed processing in accordance with the decoded result. For example, if the instruction code OP is a built-in memory access instruction, it accesses built-in memory 125, and changes the content of the field 146 for storage of left data LD or the field 147 for storage of right data RD of packet PA_FC in accordance with the access result. It then sends the resultant packet PA_FC to merge unit 126. If instruction code OP is not the built-in memory access instruction, built-in memory control unit 124 sends the received packet PA_FC to merge unit 126 without alteration, i.e., with the contents of all the fields 141–144, 146 and 147 remained unchanged.

External memory control unit 121, in receipt of packet PA_FC from branch unit 123, decodes instruction code OP of packet PA_FC, and performs prescribed processing in accordance with the decoded result. For example, if instruction code OP is an external memory access instruction, it accesses SDRAM 116 or 117 and changes the content of field 146 for storage of left data LD or field 147 for storage of right data RD of packet PA_FC in accordance with the access result. It then sends the resultant packet PA_FC to merge unit 126. If instruction code OP is not the external memory access instruction, external memory control unit 121 sends the received packet PA_FC, with the contents of all the fields 141–144, 146 and 147 remained unchanged, to merge unit 126.

Merge unit 126 sends the received packet PA_FC without alteration to operating unit 127, with the contents of all the fields 141–144, 146 and 147 of the packet PA_FC being remained unchanged.

Operating unit 127 decodes instruction code OP of packet PA_FC received from merge unit 126, and performs prescribed processing in accordance with the decoded result. For example, if instruction code OP is an operation instruction with respect to a content of packet PA_FC, operating unit 127 performs a prescribed operation in accordance with the relevant instruction code OP using the content (mainly, left data LD, right data RD) of packet PA_FC. It then generates packet PA_RT as shown in FIG. 2B by storing the operation result in its field 145 for storage of data D, and sends the generated packet PA_RT to program storing unit 128. Basically, instruction code OP, node number ND and color CL are remained unchanged.

Program memory 133 within program storing unit 128 stores a plurality of instruction codes OP to be executed subsequently and node numbers ND corresponding thereto. Program storing unit 128, in receipt of packet PA_RT from operating unit 127, reads instruction code OP to be executed next and its corresponding node number ND from program memory 133 in accordance with the addressing by node number ND of packet PA_RT, and stores the read instruction code OP and node number ND to field 141 for storage of instruction code OP and field 143 for storage of node number ND, respectively, of packet PA_RT. Program storing unit 128 then sends the generated packet PA_RT to main router 114. The contents of the field 144 for storage of color CL and the field 145 for storage of data D are remained unchanged.

FIG. 5 is a block diagram showing a schematic configuration of processing cores 112, 113. The configuration of respective processing core 112, 113 shown in FIG. 5 differs from the configuration of processing core 110, 111 in FIG. 4 in that external memory control unit 121, branch unit 123 and merge unit 126 are removed therefrom. Packet PA_FC from firing control unit 122 is sent to built-in memory control unit 124 without exception. That is, an external memory access instruction is not executed in processing core 112, 113. Otherwise, the configuration of processing core 112, 113 is identical to that of processing core 110, 111 in FIG. 4, and thus, detailed description thereof is not repeated.

As such, the processing in accordance with the data flow program prestored in program memory 133 proceeds while packets PA_RT and PA_FC go around or circulate through data driven information processor 101. In data driven information processor 101, packets PA_RT and PA_FC are transferred asynchronously by handshaking.

Pipeline processing, and hence, parallel processing is accomplished with packets PA_RT and PA_FC going around data driven information processor 101 in accordance with the data flow program stored in program memory 133. Accordingly, in data driven information processor 101, parallelism of processing in units of packets and a flow rate of a packet circulating therein constitute an important measure of processing performance of the data driven information processor 101.

In recent years, the data driven information processors having the characteristics described above have been applied to image processing, audio processing, network protocol processing and others requiring high-speed processing of a large amount of data as well as high-speed data transfer. The image processing, audio processing and network protocol processing are common in the sense that they deal with a huge amount of data.

To store such a large amount of data to be processed, the external memory 102 connected to data driven information processor 101 is utilized, since it is difficult to store all the data to be processed in an internal memory of the processor 101. External memory 102 is used as an image frame memory in the image processing, used as a temporary memory of audio data for expressing reverberation effects in the audio processing, and used as a payload memory in the network protocol processing.

Although external memory 102 has large capacity compared to the internal memory of data driven information processor 101, its data access rate is low, causing a bottleneck against distinctive parallel processing capability of data driven information processor 101. Thus, to eliminate the bottleneck, a cache memory having a high access rate is provided within data driven information processor 101 so that data driven information processor 101 can access external memory 102 via the cache memory.

As described above, there is a rule in the data driven type processing method that "processing is performed once input data necessary for the relevant processing have all become available and the resources including operating devices necessary for the processing have been allocated". Thus, the distinctive parallel processing capability of data driven information processor 101 will be enjoyed to the fullest extent if the necessary input data always reside in the cache memory.

FIG. 6 is a block diagram showing a schematic configuration of an external memory control unit 121 in a conventional data driven information processor 101. The external memory control unit 121 includes a cache memory unit 134 and an external memory interface 135. Cache memory unit 134 and external memory interface 135 operate in synchronization with each other.

External memory interface 135 is connected with an external memory port TM, and has access to an external main memory 137. External main memory 137 is formed of SDRAM 116, 117 and others. Cache memory unit 134 has a cache memory 136 therein, which has small capacity compared to external main memory 137.

Cache memory 136 stores a copy of a portion of data stored in external main memory 137. Cache memory unit 134 keeps track of a data address in external main memory 137 corresponding to the copy held in a respective data region of cache memory 136.

The data stored in external main memory 137 are referred to and updated indirectly via cache memory 136 in accordance with a content of instruction code OP of packet PA_FC flowing in external memory control unit 121. That is, cache memory 136 functions like a peep hole through which external memory 137 is observed. The data stored in external memory 137 cannot be referred to or updated directly by packet PA_FC.

If the content of instruction code OP of packet PA_FC indicates update of data stored in external main memory 137, only the copied data in cache memory 136 is updated, and the data stored in external main memory 137 is not updated. This causes mismatch between the data stored in external main memory 137 and the data stored in cache memory 136.

However, cache memory unit 134 checks for each piece of data whether the data stored in cache memory 136 and the data stored in external main memory 137 match (this state is called "clean") or mismatch (this state is called "dirty"). External memory control unit 121 performs prescribed operations based on this management information, and maintains so-called data coherency making the indirect data updating operations look like update of the data stored in external main memory 137 over the long term.

If the instruction code OP of packet PA_FC is an access instruction to external main memory 137, external memory control unit 121 refers to the management information held in cache memory unit 134 and determines whether desired data exists in cache memory 136. It is called cache "hit" when there exists the desired data in cache memory 136, while it is called cache "miss hit" if the desired data is not in cache memory 136.

In the case of cache "hit", external memory control unit 121 executes an access (reference/update) to cache memory 136. In particular, if the access to cache memory 136 is for update, cache memory unit 134 changes the management information of the relevant data to "dirty".

On the other hand, in the case of cache "miss hit", external memory control unit 121 copies desired data from external main memory 137 to cache memory 136. This operation is called "upload". For the upload, it is necessary to eliminate a piece of data from within cache memory 136 to secure a data region for uploading.

Which data region to select is determined by cache memory unit 134. Although there are a variety of selecting methods, it is common to select a piece of data having not been accessed for the longest time. Once the data to be eliminated is determined, cache memory unit 134 refers to the management information of the relevant data, and determines whether the data is "clean" or "dirty". If the data is "clean", external memory control unit 121 uploads the desired data to the relevant region of cache memory 136. The processing is thus completed.

If the data is "dirty", external memory control unit 121 writes the data to be eliminated from cache memory 136 back into its original region in external main memory 137. This operation is called "storeback". After completion of the storeback, external memory control unit 121 performs upload. At the time of cache "miss hit", external memory control unit 121 executes an access (reference/update) to cache memory 136 as in the case of cache "hit" after completion of the upload.

With the conventional external memory control unit 121 as described above, however, if packet PA_FC indicates an access instruction to external main memory 137 and cache memory unit 134 determines as cache "miss hit", then packet PA_FC should be queued in external memory control unit 121 from the time when the determination of cache "miss hit" is made until the time when an access to cache memory 136 is started.

After the determination of cache "miss hit", packet PA_FC should be queued in the worst case for a total period of time of: time for searching data to be eliminated for the upload to cache memory 136; time for determining "clean/dirty" of the data being eliminated; and, when the data is "dirty", time for storing the data being eliminated back to external main memory 137 and time for uploading the desired data from external main memory 137 to cache memory 136. Among them, the storeback and upload are performed with respect to external main memory 137 whose access rate is low, making the queuing time of packet PA_FC extremely long.

Such a long queuing time of packet PA_FC within external memory control unit 121 delays the operation in operating unit 127, and hence delays the start time of processing of the subsequent instructions. Further, although data driven information processor 101 is characterized by the parallel processing by pipeline processing, when another packet PA_FC arrives from behind the packet PA_FC being queued in external memory control unit 121 due to the cache "miss hit", processing of the another packet PA_FC should also be waited. This would degrade the overall parallel processing capability of data driven information processor 101.

The basic characteristics of data accesses in the image processing, audio processing, network protocol processing and others are that they are conducted regularly, and that data to be accessed next is predictable. In the image processing, data are basically accessed sequentially along the scanning line direction of the image frame. In the audio processing, data are basically accessed sequentially along the time axis direction of the audio data. In the network protocol processing, data in a network frame, particularly the payload data, are basically accessed in ascending order of offset value from the header of the frame.

In the conventional data driven information processor as described above, even if the data accesses are performed regularly, cache "miss hit" would steadily occur upon access to external main memory 137, thereby inevitably degrading the parallel processing capability of data driven information processor 101.

SUMMARY OF THE INVENTION

An object of the present invention is to provide an external memory control device permitting upload and storeback without degrading parallel processing capability of a data driven type information processing apparatus, and a data driven type information processing apparatus including the relevant external memory control device.

Another object of the present invention is to provide an external memory control device unnecessary to store management information in a cache memory and permitting reduction of hardware.

A further object of the present invention is to provide an external memory control device allowing a processing core to access an arbitrary external memory.

A still further object of the present invention is to provide an external memory control device with an improved packet transfer rate by separation of a cache memory access for execution of an operation from a cache memory access for data exchange.

According to an aspect of the present invention, an external memory control device for use in a data driven type information processing apparatus performing processing while storing a copy of a portion of data stored in an external memory in a cache memory includes: an external memory interface regularly reading ahead data from the external memory at a prescribed timing; and a cache memory unit storing the data read ahead by the external memory interface in the cache memory and performing data access to the cache memory in accordance with a data access request to the external memory.

Since the external memory interface regularly reads ahead data from the external memory at a prescribed timing, data corresponding to the access request to the external memory are always held in the cache memory. This prevents degradation of parallel processing capability of the data driven type information processing apparatus.

According to another aspect of the present invention, an external memory control device for use in a data driven type information processing apparatus performing processing while storing a copy of a portion of data stored in an external memory in a cache memory includes: a plurality of external memory interfaces each regularly reading ahead data from the external memory at a prescribed timing; a router selectively sending out the data read ahead by the plurality of external memory interfaces; and a plurality of cache memory units each storing the data selectively sent out by the router in the cache memory and performing data access to the cache memory in accordance with a data access request to the external memory.

Since the router selectively sends out the data read ahead by the plurality of external memory interfaces to the plurality of cache memory units, a processing core is allowed to access an arbitrary external memory.

According to a further aspect of the present invention, a data driven type information processing apparatus performing processing while storing a copy of a portion of data stored in an external memory in a cache memory includes: a main router selectively sending out a first packet; a plurality of processing cores each performing an operation in accordance with the first packet selectively sent out from the main router and sending out a second packet including an upload request at a prescribed timing; a plurality of external memory interfaces each receiving the upload request and regularly reading ahead data from the external memory; and a router selectively sending the second packets sent from the plurality of processing cores to the plurality of external memory interfaces. The processing core stores the data read ahead by the external memory interface in the cache memory and accesses the cache memory in accordance with a data access request to the external memory included in the first packet.

Since the router selectively sends the second packets sent out from the plurality of processing cores to the plurality of external memory interfaces, each processing core is allowed to access an arbitrary external memory via a corresponding external memory interface.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13A–13C illustrate read-ahead upload performed by the external memory control unit 21.

FIGS. 14A–14C illustrate storeback performed by the external memory control unit 21.

FIG. 15 is a block diagram showing a schematic configuration of the external memory control unit 31 according to a second embodiment of the present invention.

FIGS. 19A and 19B illustrate packets PA_EX generated when the external memory interface 53 uploads data to the cache memory unit 52.

FIGS. 20A–20C illustrate packets PA_EX generated when the external memory interface 53 stores data back to the external main memory 25.

FIG. 21 illustrates a packet PA_EX indicating the external memory write, generated by the cache memory unit 52a.

DESCRIPTION OF THE PREFERRED EMBODIMENTS

First Embodiment

Figure 7:
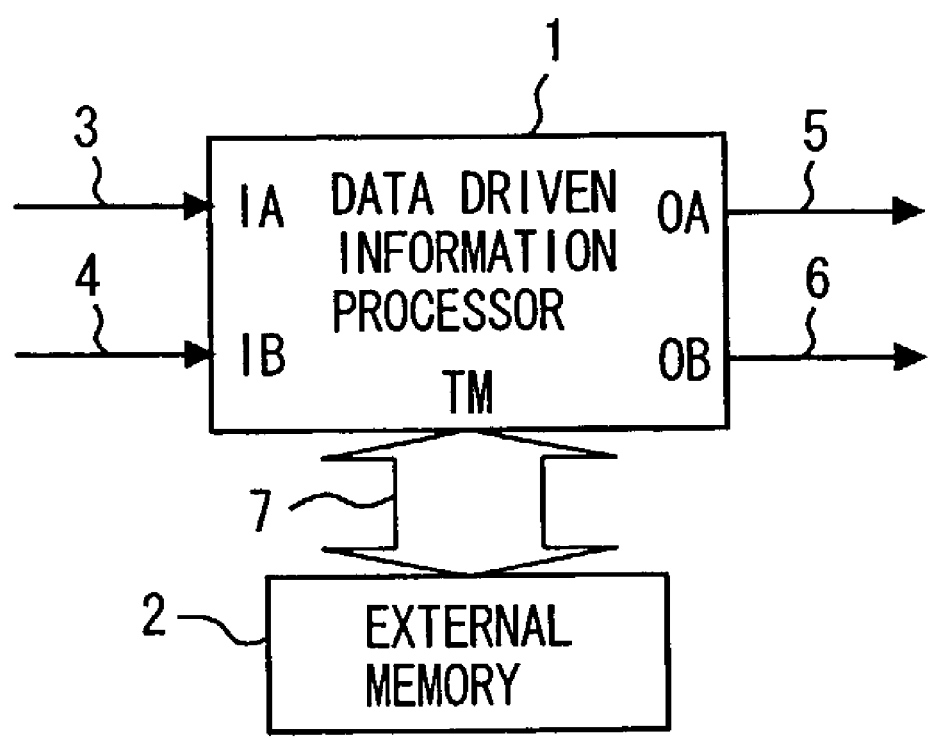
FIG. 7 is a block diagram showing a schematic configuration of the data driven type information processing system according to a first embodiment of the present invention.

FIG. 7 is a block diagram showing a schematic configuration of the data driven type information processing system according to the first embodiment of the present invention. This data driven type information processing system includes a data driven information processor 1, and an external memory 2 for storage of data to be processed by data driven information processor 1 and others.

Data driven information processor 1 is provided with input ports IA and IB connected with data transmission paths 3 and 4, respectively, output ports OA and OB connected with data transmission paths 5 and 6, respectively, and an external memory port TM connected with an access control line 7.

Data driven information processor 1 inputs packets PA_IO from input ports IA and IB via data transmission paths 3 and 4 in time series. Data driven information processor 1 has prescribed processing contents prestored therein as programs, and performs processing with respect to input packets PA_IO in accordance with the program contents.

External memory 2, in receipt of an access request signal from external memory port TM of data driven information processor 1 via access control line 7, performs an access in accordance with the access request, and acknowledges the access request to data driven information processor 1.

After completion of the processing of the input packet, data driven information processor 1 outputs the packet PA_IO including the processed contents via output port OA and data transmission path 5, or via output port OB and data transmission path 6.

Figure 3:
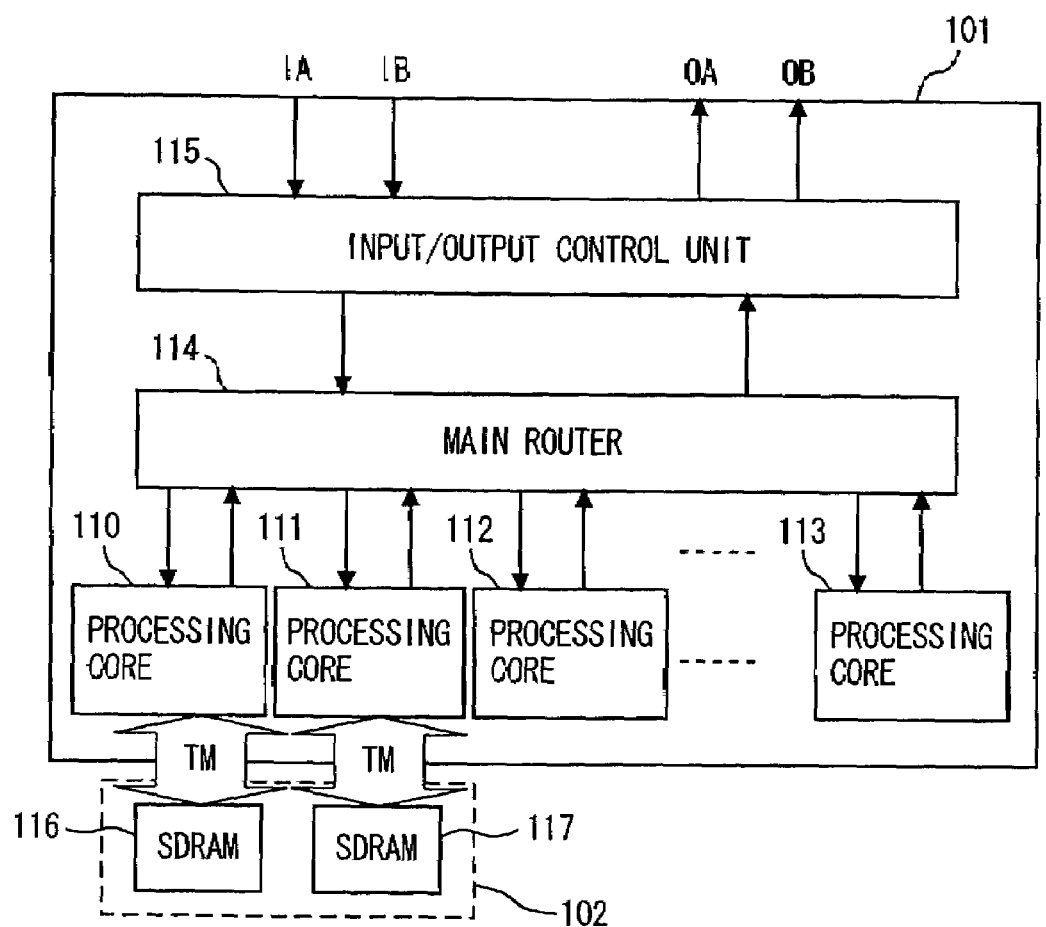
FIG. 3 is a block diagram showing schematic configurations of the data driven information processor 101 and the external memory 102.
Figure 8:
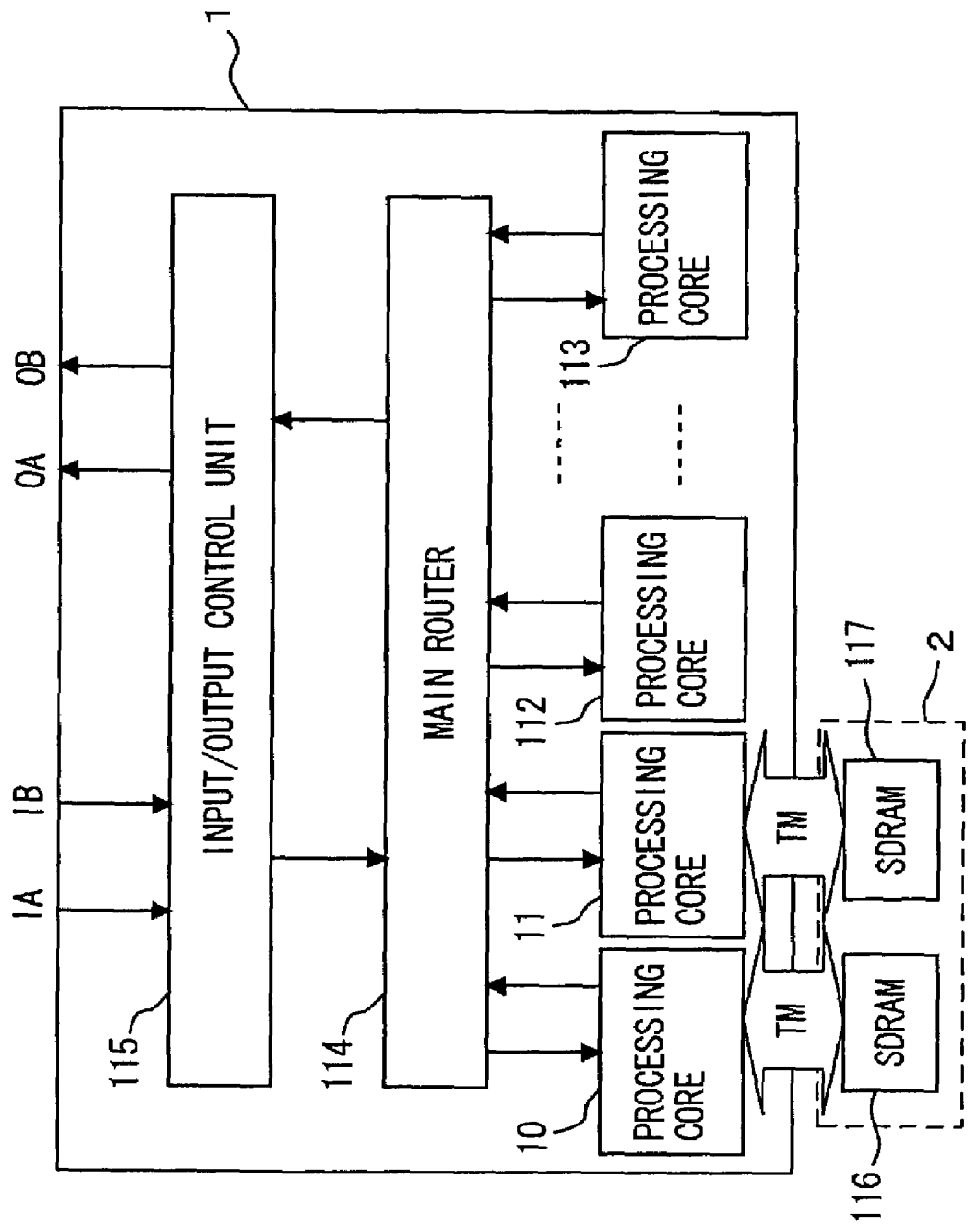
FIG. 8 is a block diagram showing a schematic configuration of the data driven information processor 1 in the first embodiment.

FIG. 8 is a block diagram showing a schematic configuration of data driven information processor 1 of the first embodiment. Data driven information processor 1 of the present embodiment differs from the conventional data driven information processor 101 shown in FIG. 3 only in the configuration and function of the processing cores connected to the external memory, and thus, detailed description of the common configurations and functions is not repeated. The relevant processing cores of the present embodiment are denoted by 10 and 11.

Figure 4:
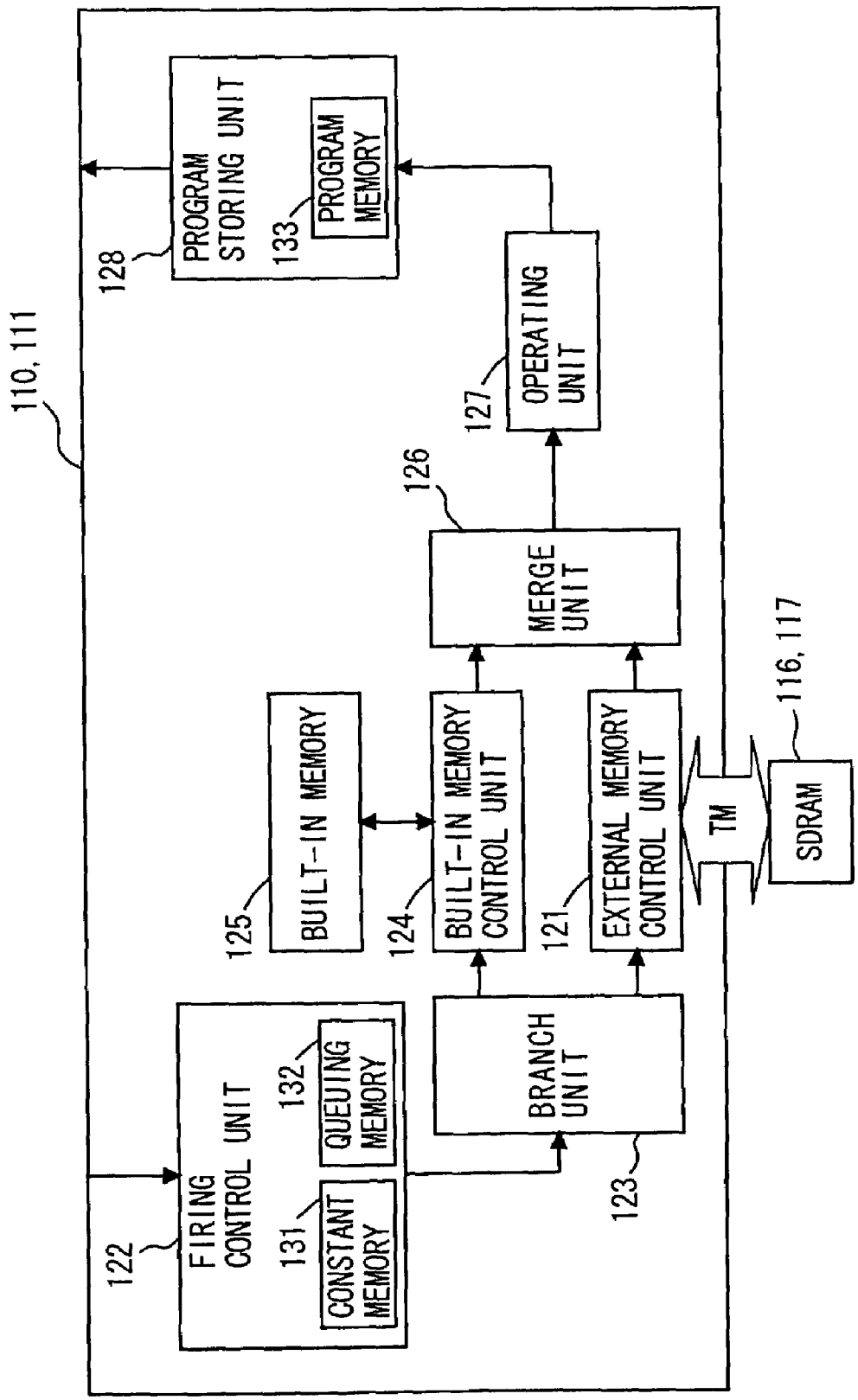
FIG. 4 is a block diagram showing a schematic configuration of the processing core 110, 111.
Figure 5:
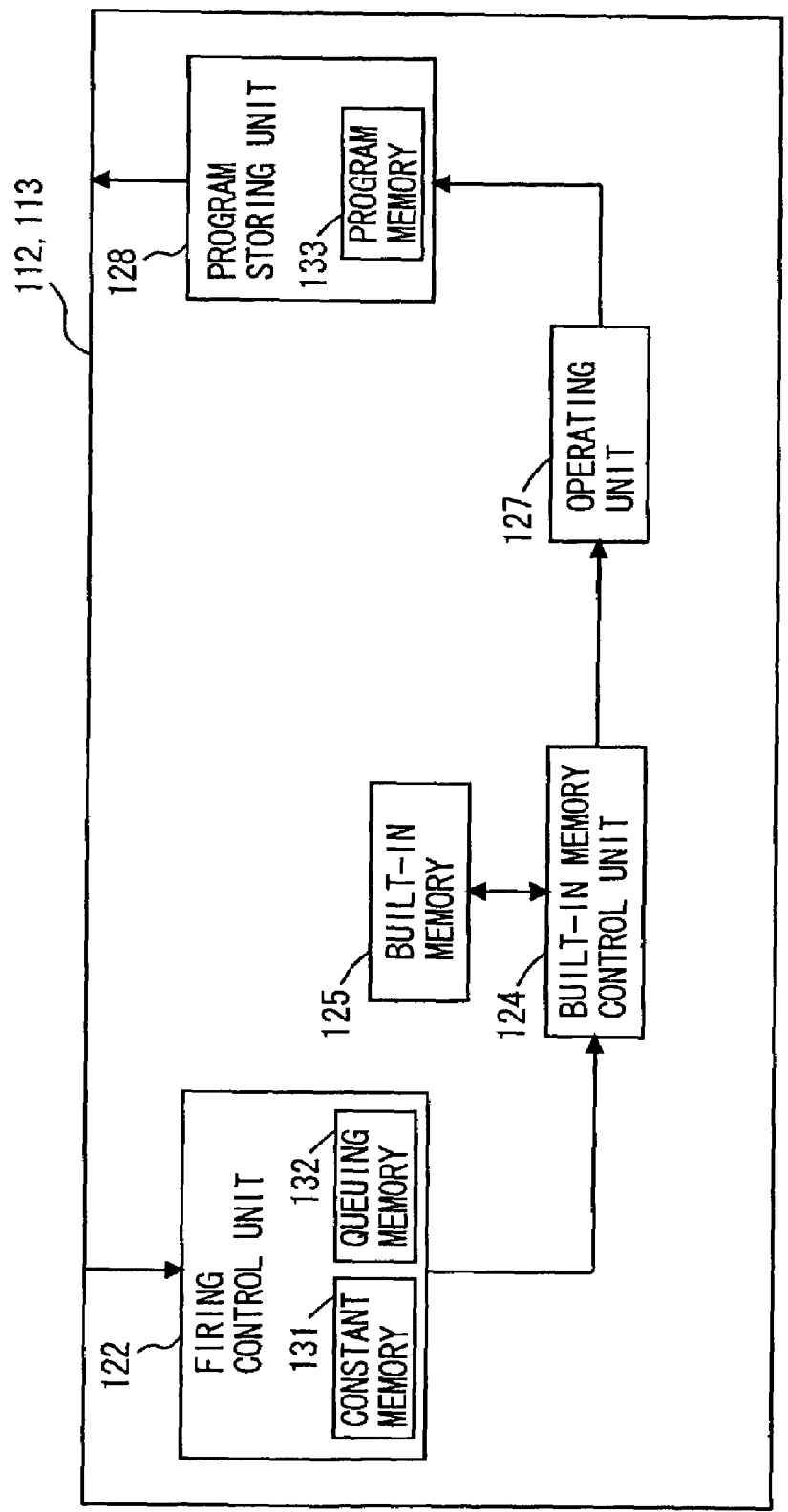
FIG. 5 is a block diagram showing a schematic configuration of the processing core 112, 113.
Figure 6:
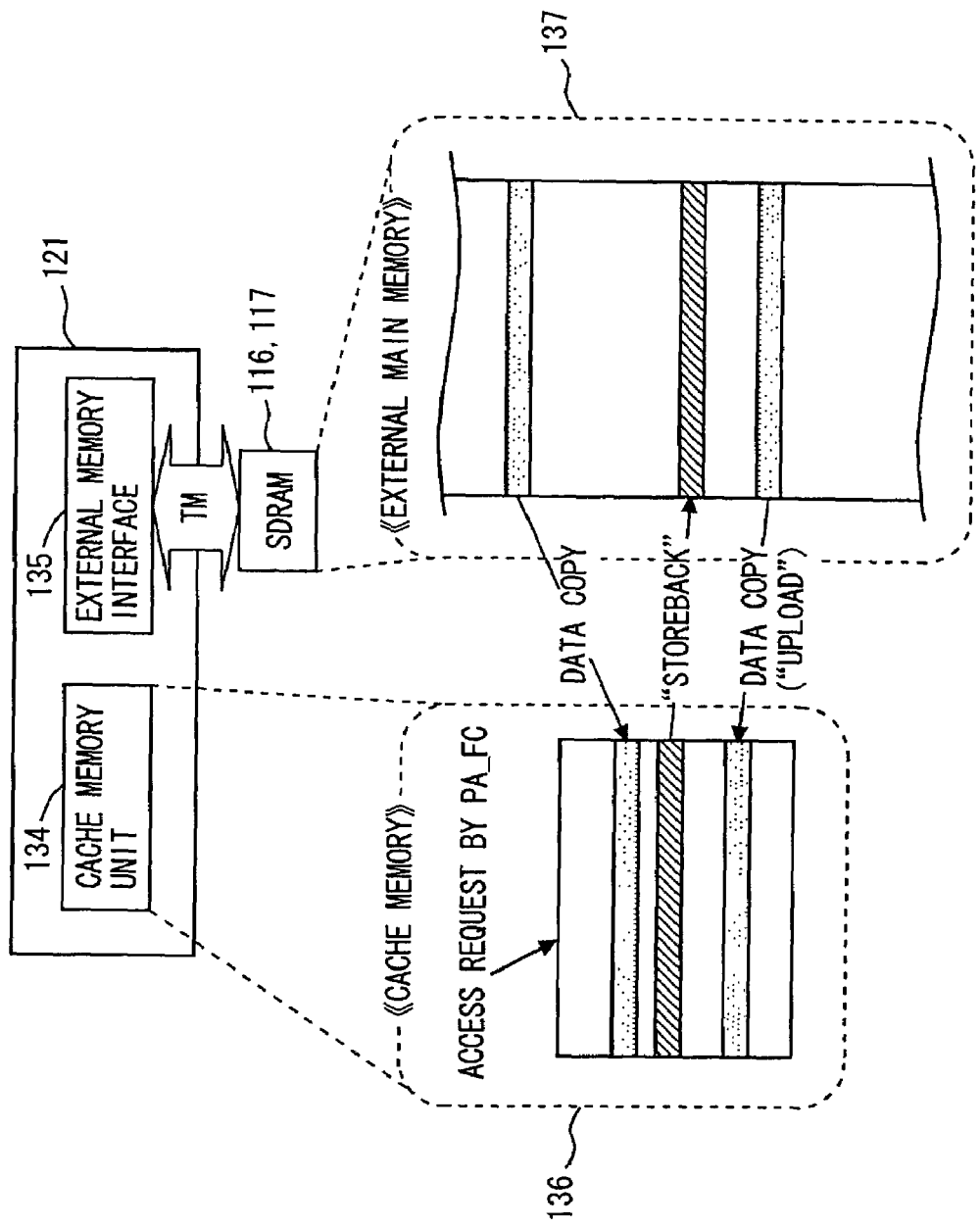
FIG. 6 is a block diagram showing a schematic configuration of the external memory control unit 121 within the conventional data driven information processor 101.
Figure 9:
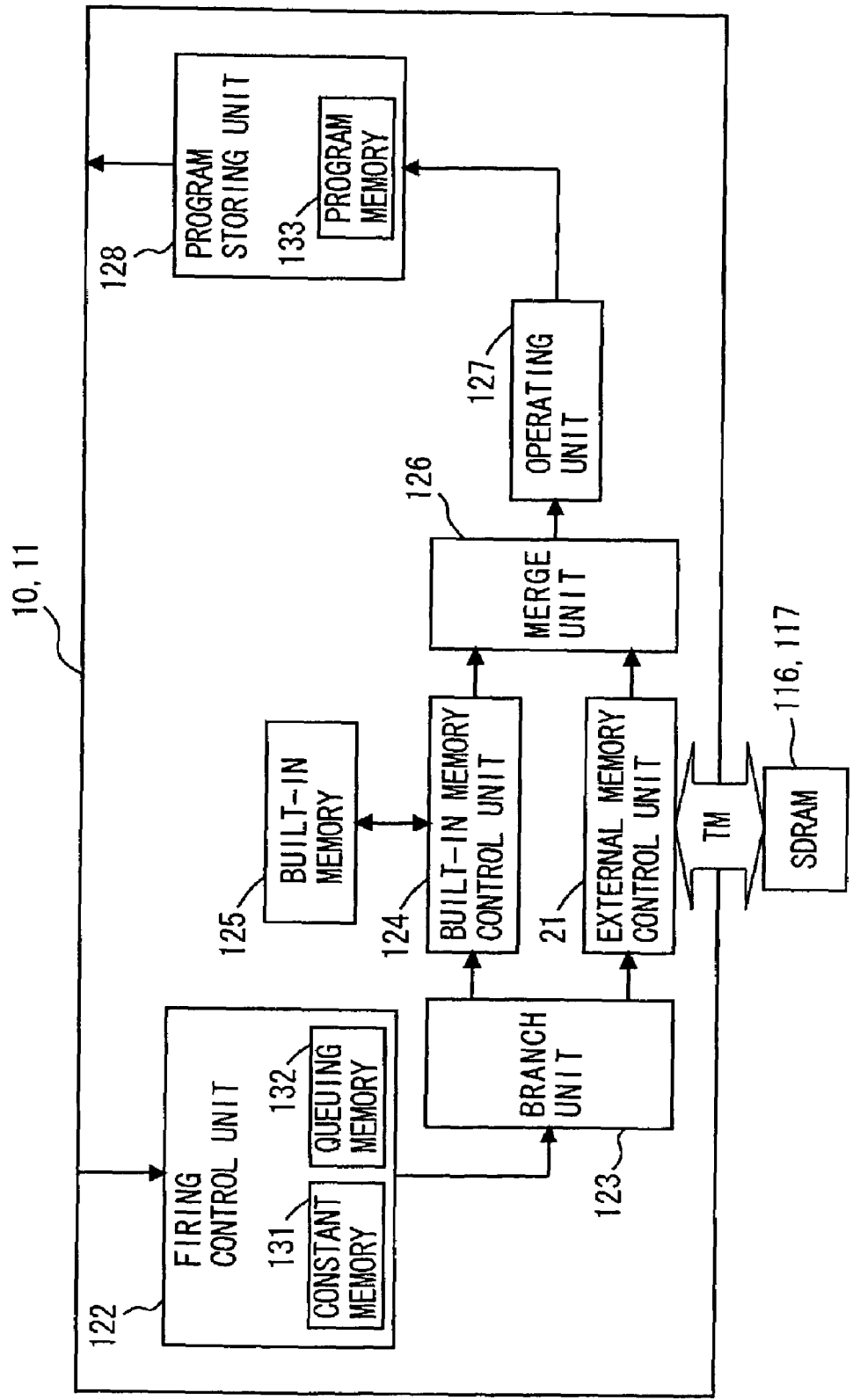
FIG. 9 is a block diagram showing a schematic configuration of the processing core 10, 11 in the first embodiment.

FIG. 9 is a block diagram showing a schematic configuration of the respective processing cores 10 and 11 of the first embodiment. Processing cores 10 and 11 of the present embodiment differ from the conventional processing cores 101 and 102 shown in FIG. 4 only in the function of the external memory control unit connected to the external memory port TM, and thus, detailed description of the common configurations and functions is not repeated. The external memory control unit of the present embodiment is denoted by 21.

Figure 10:
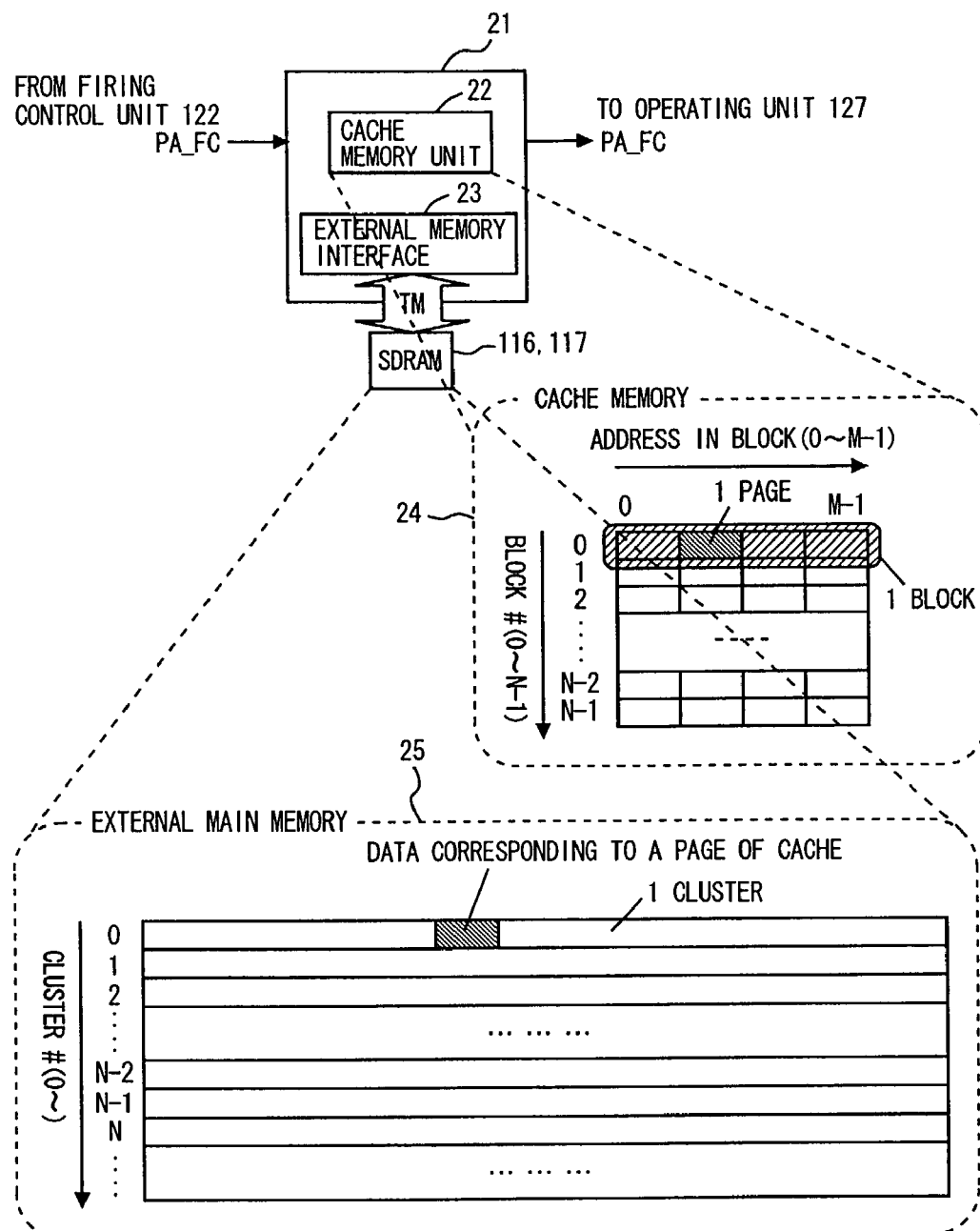
FIG. 10 is a block diagram showing a schematic configuration of the external memory control unit 21 in the first embodiment.

FIG. 10 is a block diagram showing a schematic configuration of external memory control unit 21 of the first embodiment. This external memory control unit 21 includes a cache memory unit 22, and an external memory interface 23 connected to an SDRAM 116 or 117 via external memory port TM. External memory interface 23 is allowed to access (refer to/update) SDRAM 116 or 117 via external memory port TM.

Figure 1:
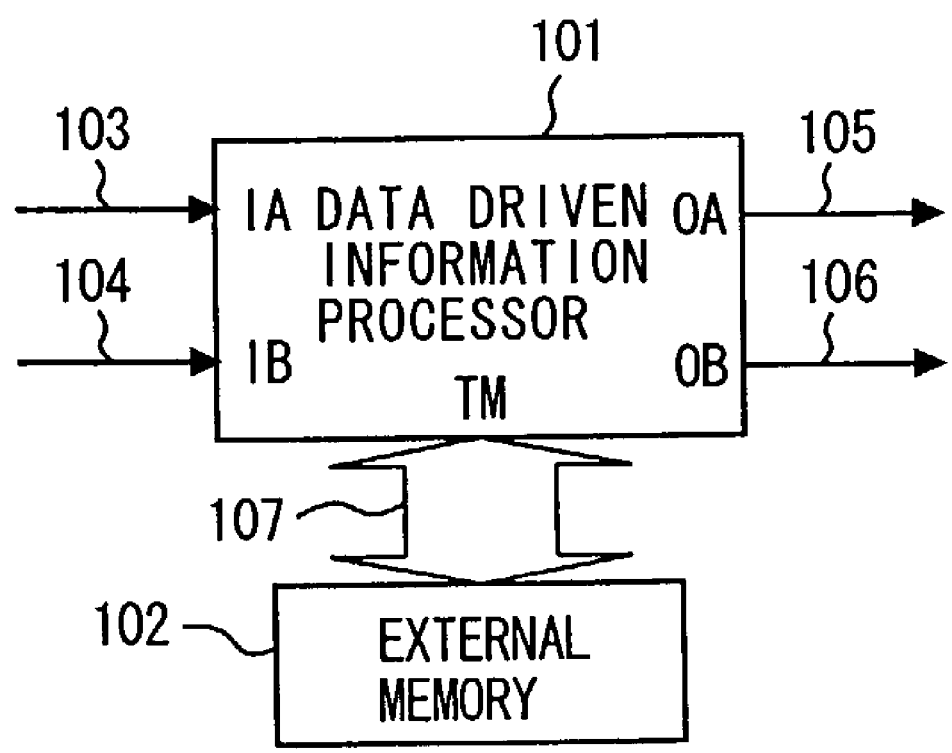
FIG. 1 is a block diagram showing a schematic configuration of a conventional data driven type information processing system.
Figure 2A:
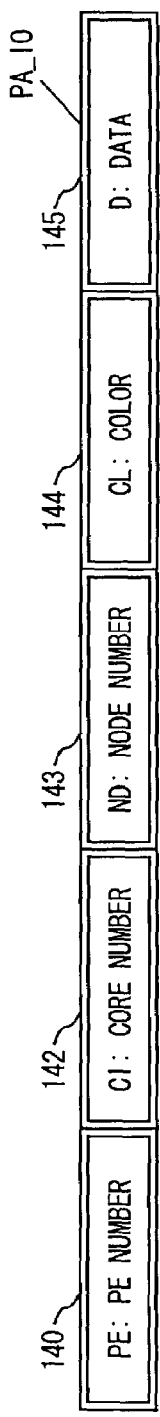
FIGS. 2A–2C illustrate packets for use in the data driven information processor 101.
Figure 2B:
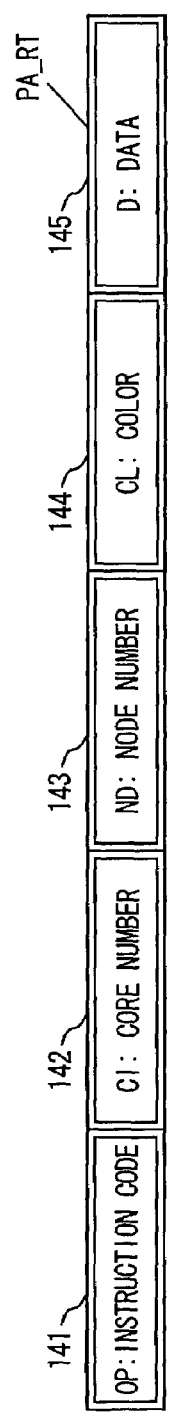
Figure 2C:
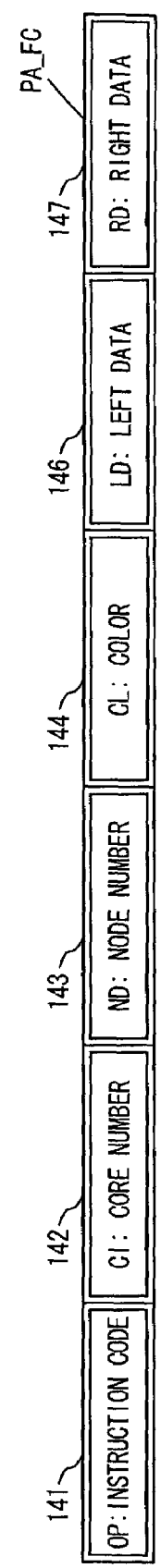

External memory control unit 21, in receipt of a packet PA_FC from a firing control unit 122, performs prescribed processing with respect to packet PA_FC by carrying out prescribed operations in accordance with the contents indicated in the respective fields of packet PA_FC. External memory control unit 21 sends the packet PA_FC having undergone the prescribed processing to an operating unit 127. The configuration of the packet PA_FC is the same as that shown in FIG. 2C.

External memory interface 23 is connected with external memory port TM, and has a function to access external main memory 25. External main memory 25 is formed of SDRAM 116 and 117 and others. Cache memory unit 22 has a cache memory 24 therein, which has small capacity compared to external main memory 25.

Cache memory 24 stores a copy of a portion of the data stored in external main memory 25. The data stored in external main memory 25 is referred to/updated indirectly via cache memory 24 in accordance with the content of instruction code OP of packet PA_FC flowing in external memory control unit 21.

The entire region of cache memory 24 is divided into a plurality of blocks having the same capacity. FIG. 10 shows the overall region of cache memory 24 divided into N blocks, with each block formed of M words. The respective blocks divided are given block numbers BLK of 0, 1, 2, . . . , (N−1). The respective words in each block are given addresses in block AIB of 0, 1, 2, . . . , (M−1). Each divided block is further divided into a plurality of pages having the same capacity. FIG. 10 shows the blocks each divided into four pages.

The entire region of external main memory 25 is divided into a plurality of clusters having the same capacity. The size of one cluster is made sufficiently large compared to the size of one block of cache memory 24. The respective words in a cluster are given address offset values in order from 0. The respective clusters divided are given serial numbers of 0, 1, 2, . . . , (N−1), N, (N+1), . . . , which are called "cluster numbers".

Cache memory 24 copies a portion of the data stored in external main memory 25. The data in the cluster of cluster number 0 of external main memory 25 is uploaded to a page in the block of block number 0 of cache memory 24, and the data in the cluster of cluster number 1 is uploaded to a page in the block of block number 1. The data in the cluster of cluster number (N−1) is uploaded to a page in the block of block number (N−1). Similarly, the data in the cluster of cluster number N is uploaded to a page in the block of block number 0, and the data in the clusters of cluster number (N+1) and subsequent numbers are uploaded to pages in the respective blocks of block number 1 and subsequent numbers.

Figure 11:
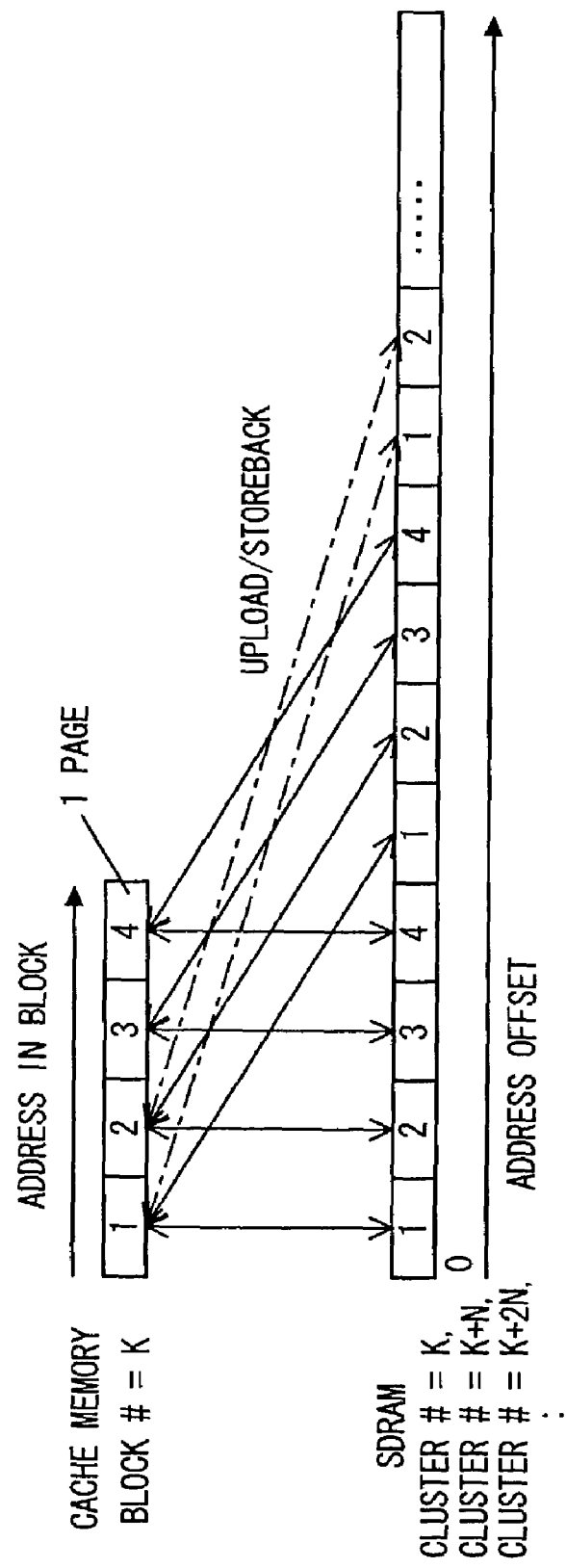
FIG. 11 shows a relation between a block in the cache memory 24 and a cluster in the external main memory 25.

FIG. 11 shows a relation between a block of cache memory 24 and a cluster of external main memory 25. The block of block number K of cache memory 24 is utilized in turn by the cluster of cluster number K, the cluster of cluster number K+N, the cluster of cluster number K+2N . . . (the clusters of cluster numbers K+n×N (n=0, 1, 2, . . . )) of external main memory 25.

Assume that one of these clusters is exclusively utilizing the block of block number K. Then, at the time when data in the relevant cluster of external main memory 25 are being uploaded to cache memory 24, the address in block will always be determined uniquely. Specifically, the data corresponding to the first page of the cluster is uploaded to the first page of the block in cache memory 24, the data corresponding to the next page of the cluster is uploaded to the second page of the block, the data corresponding to the third page of the cluster is uploaded to the third page of the block, and the data corresponding to the fourth page of the cluster is uploaded to the fourth page of the block.

Similarly, the data corresponding to the fifth through eighth pages of the cluster are uploaded respectively to the first through fourth pages of the block in cache memory 24. Thereafter, the data corresponding to the ninth and succeeding pages of the cluster are uploaded respectively to the first through fourth pages of the block. The same relation applies to the case of storeback.

An access request to external main memory 25 is issued by providing packet PA_FC to external memory control unit 21. The following explanation is on the presumption that, focusing on a certain cluster of external main memory 25, reading/writing is performed with regularity that it always starts with an address offset value of 0, and continues in ascending order of the address offset value.

Figure 12A:
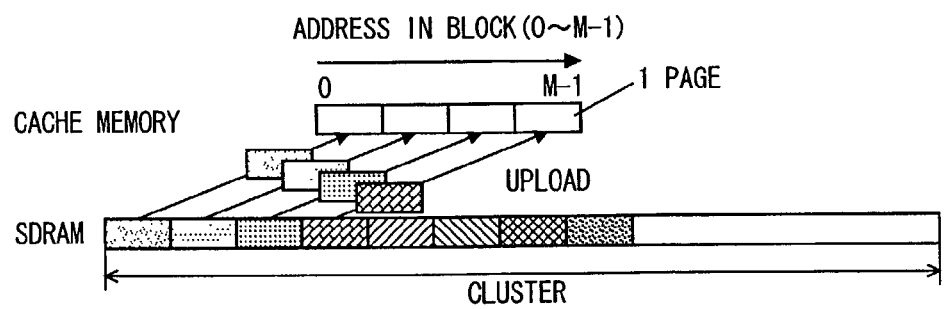
FIGS. 12A–12C illustrate data for one page of a cluster of the external main memory 25 being uploaded sequentially to the cache memory 24.
Figure 12B:
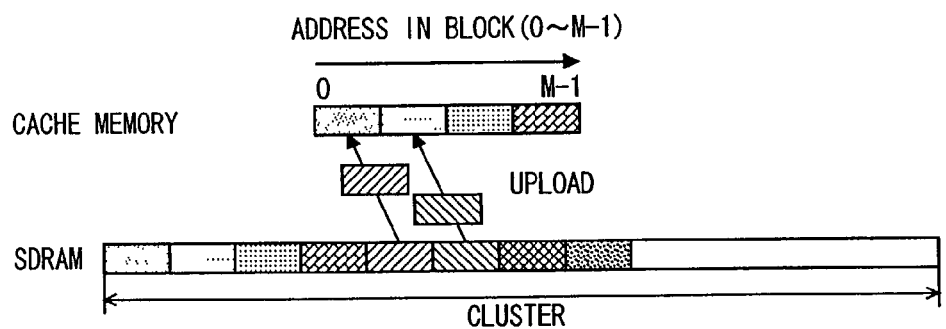
Figure 12C:
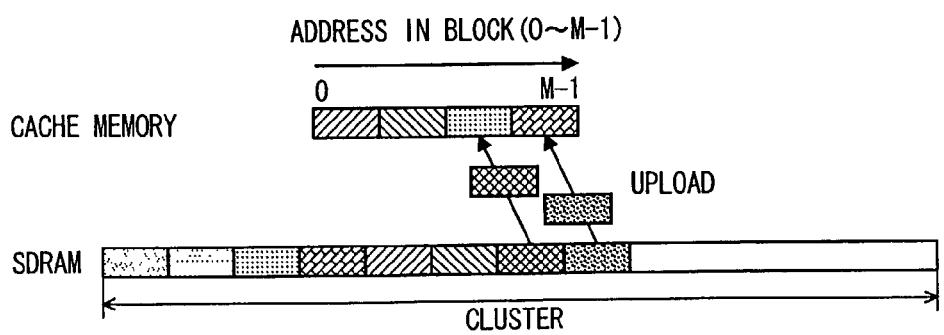

FIGS. 12A–12C illustrate how data for one page in a cluster of external main memory 25 are uploaded sequentially to cache memory 24. It is assumed that external memory control unit 21 presents read requests to external main memory 25 in ascending order of address offset value from 0. Writing is not to be performed during the reading of the entire cluster; reading is not to be performed during the writing of the entire cluster. Reading and writing of a plurality of clusters may be performed in parallel. Each block of cache memory 24 is exclusively used by one cluster at any time, not shared by a plurality of clusters of external main memory 25.

FIG. 12A shows that data of the first through fourth pages of a certain cluster in external main memory 25 are uploaded to the first through fourth pages of a block in cache memory 24. FIG. 12B shows that data of the fifth and sixth pages of the same cluster are uploaded to the first and second pages of the same block for replacement. FIG. 12C shows that data of the seventh and eighth pages of the same cluster are uploaded to the third and fourth pages of the same block for replacement.

External memory control unit 21, upon receipt of packet PA_FC, refers to the color CL, left data LD and right data RD of packet PA_FC and calculates an address of external main memory 25 to access. The calculating method of the address is determined by instruction code OP of packet PA_FC. As described above, when the address to be accessed in external main memory 25 is determined, the corresponding block number and the address in block in cache memory 24 will be determined uniquely.

If instruction code OP of packet PA_FC is an external memory read instruction, external memory control unit 21 reads the data in cache memory 24 designated by the block number and the address in block. It stores the data in packet PA_FC, in the field for storage of left data LD or the field for storage of right data RD, and sends the resultant packet PA FC to operating unit 127.

Here, if the address in block is an address indicating the last word of a certain page, external memory control unit 21 simultaneously starts an uploading operation, which will be described later in detail.

On the other hand, if instruction code OP of packet PA_FC is an external memory write instruction, external memory control unit 21 writes the value of left data LD to a region in cache memory 21 designated by the block number and the address in block, and sends the packet PA_FC to operating unit 127. Here, if the address in block is an address indicating the last word of a certain page, external memory control unit 21 simultaneously starts a storeback operation, which will be described later in detail.

FIGS. 13A–13C illustrate read-ahead upload performed by external memory control unit 21. In FIGS. 13A–13C, a pointer "reading" indicates a word on the address in block of the block number calculated by external memory control unit 21. This pointer "reading" sequentially moves in a direction along which the address in block increases. When it reaches the largest address in block of the rightmost page, it returns to the address in block of 0 of the leftmost page.

In this process, when the pointer "reading" points the last word of a certain page of cache memory 24, external memory control unit 21 starts the uploading operation. This read-ahead uploading operation is performed with respect to a page in external main memory 25 that is a prescribed number of pages added to the relevant page including the data indicated by the pointer "reading".

External memory control unit 21 repeats data reading from the second page in a block of cache memory 24, as shown in FIG. 13A. When the pointer "reading" reaches the last word of the second page in the block of cache memory 24, as shown in FIG. 13B, upload of the data on the eighth page in the same cluster of external main memory 25 to the page after the next, i.e., the fourth page, in the same block of cache memory 24 is started.

The data reading by packet PA_FC and the read-ahead upload of the fourth page in the block of cache memory 24 are performed in parallel. As shown in FIG. 13C, the read-ahead upload of the fourth page in the block of cache memory 24 is completed during the data reading of the third page in the same block by packet PA_FC. It means that the data of the fourth page will have been uploaded before the start of the data reading of the fourth page by packet PA_FC.

FIGS. 14A–14C illustrate the storeback performed by external memory control unit 21. In FIGS. 14A–14C, the pointer "writing" indicates a word on the address in block of the block number calculated by external memory control unit 21. This pointer "writing" moves sequentially in a direction along which the address in block increases. When it reaches the largest address in block of the rightmost page, it returns to the address in block of 0 of the leftmost page.

In this process, when the pointer "writing" points the last word of a page in a block of cache memory 24, external memory control unit 21 starts the write-back operation. This write-back operation is performed with respect to the page in the block of cache memory 24 including the data pointed by the pointer "writing".

External memory control unit 21 repeats the data writing to the second page in a block of cache memory 24, as shown in FIG. 14A. When the pointer "writing" reaches the last word of the second page in the block of cache memory 24, as shown in FIG. 14B, external memory control unit 21 starts the write-back of the data of the second page in the block of cache memory 24 including the pointed data.

The data writing by packet PA_FC and the storeback of the data of the second page in the block of cache memory 24 are performed in parallel. The storeback of the data of the second page in the block of cache memory 24 is completed during the data writing of the third page in the same block by packet PA_FC, as shown in FIG. 14C.

As described above, data driven information processor 1 according to the present embodiment is applied to a series of access requests that are performed with the regularity that reading/writing of one cluster of external main memory 25 is always started from the address offset value of 0 and is continued in ascending order of the address offset value, and that the reading and writing are not performed simultaneously, as in the image processing, audio processing, network protocol processing and others.

In the present embodiment, external memory control unit 21 is configured to perform the read-ahead upload and the write-back in the above-described manners. This eliminates the need to keep track of the addresses of the data copied from external main memory 25 to cache memory 24 as in the conventional data driven information processor as well as the need of the management information about whether the data is clean or dirty, thereby allowing considerable reduction of the hardware.

Further, external memory control unit 21 is configured to start the read-ahead upload or storeback of a prescribed page at the time when reading or writing is performed with respect to the last word of a page in cache memory 24. This ensures that necessary data always exists in cache memory 24, i.e., the cache hit, when there is a read request or write request with respect to external main memory 25 by packet PA_FC. Thus, the queuing time for the storeback or upload operation otherwise caused by the cache miss hit is eliminated. A packet PA_FC to be executed following the relevant packet PA_FC is executed without delay, and progress of a succeeding packet PA_FC is unprevented in external memory control unit 21. Accordingly, degradation of the parallel processing capability of the data driven information processor is prevented.

Second Embodiment

The data driven information processor according to the second embodiment of the present invention is identical to data driven information processor 1 of the first embodiment shown in FIGS. 7–10 except the configuration and function of the external memory control unit. Thus, detailed description of the common configurations and functions will be not repeated. The external memory control unit of the present embodiment is denoted by 31.

FIG. 15 is a block diagram showing a schematic configuration of the external memory control unit 31 of the second embodiment. External memory control unit 31 includes a cache memory unit 32, an external memory interface 33 connected to an SDRAM 116 or 117 via an external memory port TM, and a parameter register 34.

A degree of read-ahead (number of pages to be read ahead) in the read-ahead upload by external memory control unit 31 is set in parameter register 34. While the read-ahead upload was conducted for the data of two pages ahead in the first embodiment, external memory control unit 31 of the present embodiment performs the read-ahead upload of the data of a number of pages ahead corresponding to the value set in parameter register 34. It is needless to say that the read-ahead upload of the data is inhibited with respect to a page in cache memory 24 for which reading or writing has not yet been performed by packet PA_FC.

External memory control unit 31 receives packet PA_FC. If the instruction code OP of the packet PA_FC indicates loading to parameter register 34, it writes the value of left data LD of packet PA_FC to parameter register 34, and erases the packet PA_FC from within external memory control unit 31. Other operations of external memory control unit 31 are the same as those of external memory control unit 21 of the first embodiment, and therefore, detailed description thereof is not repeated.

As described above, according to the data driven information processor of the present embodiment, the read-ahead upload is performed for data of a prescribed number of pages ahead, which number corresponds to the value set in parameter register 34. Thus, the degree of read-ahead upload can be changed appropriately in accordance with the access rate of external main memory 25.

Third Embodiment

The data driven information processor according to the third embodiment of the present invention is identical to the data driven information processor 1 of the first embodiment shown in FIGS. 7–10 except the configuration and function of the external memory control unit. Thus, detailed description of the common configurations and functions is not repeated. The external memory control unit of the present embodiment is denoted by 41.

Figure 16:
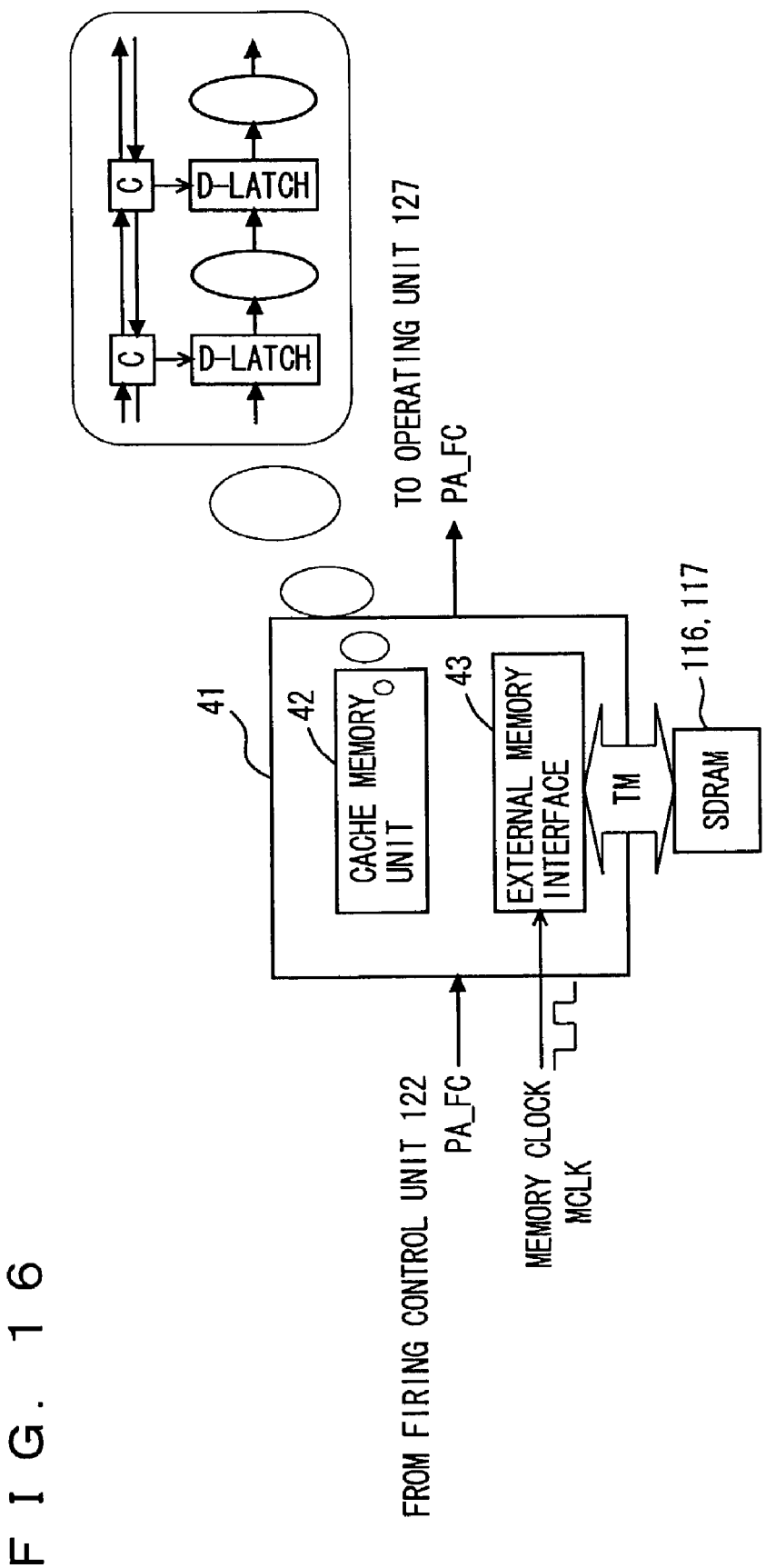
FIG. 16 is a block diagram showing a schematic configuration of the external memory control unit 41 according to a third embodiment of the present invention.

FIG. 16 is a block diagram showing a schematic configuration of the external memory control unit 41 of the third embodiment. External memory control unit 41 includes a cache memory unit 42, and an external memory interface 43 connected to an SDRAM 116 or 117 via an external memory port TM.

External memory interface 43 receives a memory clock MCLK. Memory clock MCLK is an operating base clock of external main memory 25. External main memory 25 performs high-speed access in synchronization with memory clock MCLK.

External memory interface 43 operates in synchronization with memory clock MCLK. By comparison, cache memory unit 42 operates in accordance with a self-synchronous transfer control circuit constituting a basis of the packet operations of the data driven information processor. That is, cache memory unit 42 operates as packets held in latches are transferred in synchronization with a clock that is different from memory clock MCLK, as shown in FIG. 16. Accordingly, without any direct dependencies between the operation in cache memory 42 and the access operation to the external main memory in external memory interface unit 43, cache memory unit 42 and external memory interface 43 operate individually from and in parallel with each other. Other operations of external memory control unit 41 are identical to those of external memory control unit 21 of the first embodiment, so that detailed description thereof is not repeated.

As described above, according to the data driven information processor of the present embodiment, external memory interface unit 43 is configured to perform the access operation to external main memory 25 in synchronization with memory clock MCLK, to eliminate any operational dependencies with cache memory unit 42. This permits parallel operations of cache memory unit 42 and external memory interface 43, and thus ensures a still faster operation of external memory control unit 41.

Fourth Embodiment

The data driven information processor according to the fourth embodiment of the present invention is identical to data driven information processor 1 of the first embodiment shown in FIGS. 7–10 except the configuration and function of the external memory control unit. Thus, detailed description of the common configurations and functions is not repeated. The external memory control unit of the present embodiment is denoted by 51.

Figure 17:
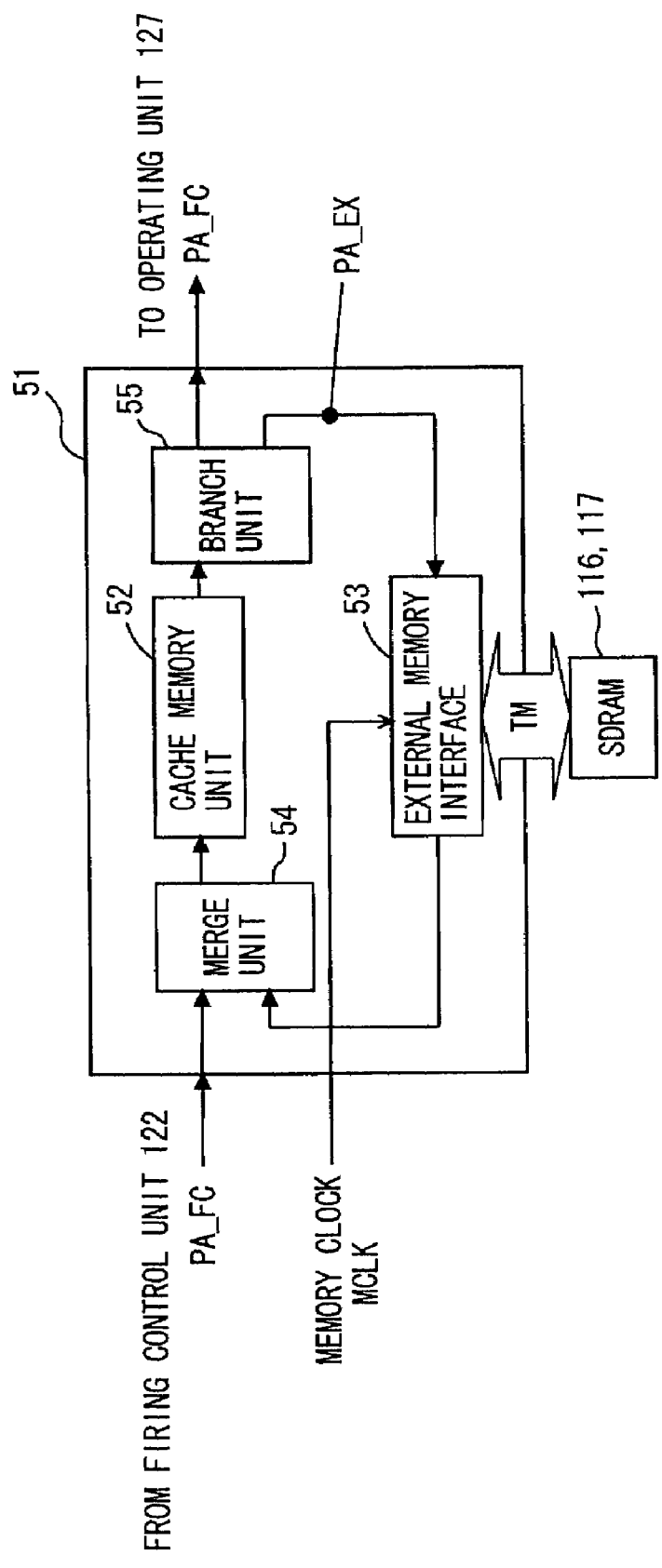
FIG. 17 is a block diagram showing a schematic configuration of the external memory control unit 51 according to a fourth embodiment of the present invention.

FIG. 17 is a block diagram showing a schematic configuration of the external memory control unit 51 of the fourth embodiment. External memory control unit 51 includes a cache memory unit 52, an external memory interface 53 connected to an SDRAM 116 or 117 via an external memory port TM, a merge unit 54, and a branch unit 55.

External memory interface 53 receives a memory clock MCLK. This memory clock MCLK is an operating base clock of external main memory 25, and external main memory 25 performs high-speed access in synchronization with memory clock MCLK.

Figures 18A, 18B, 18C:
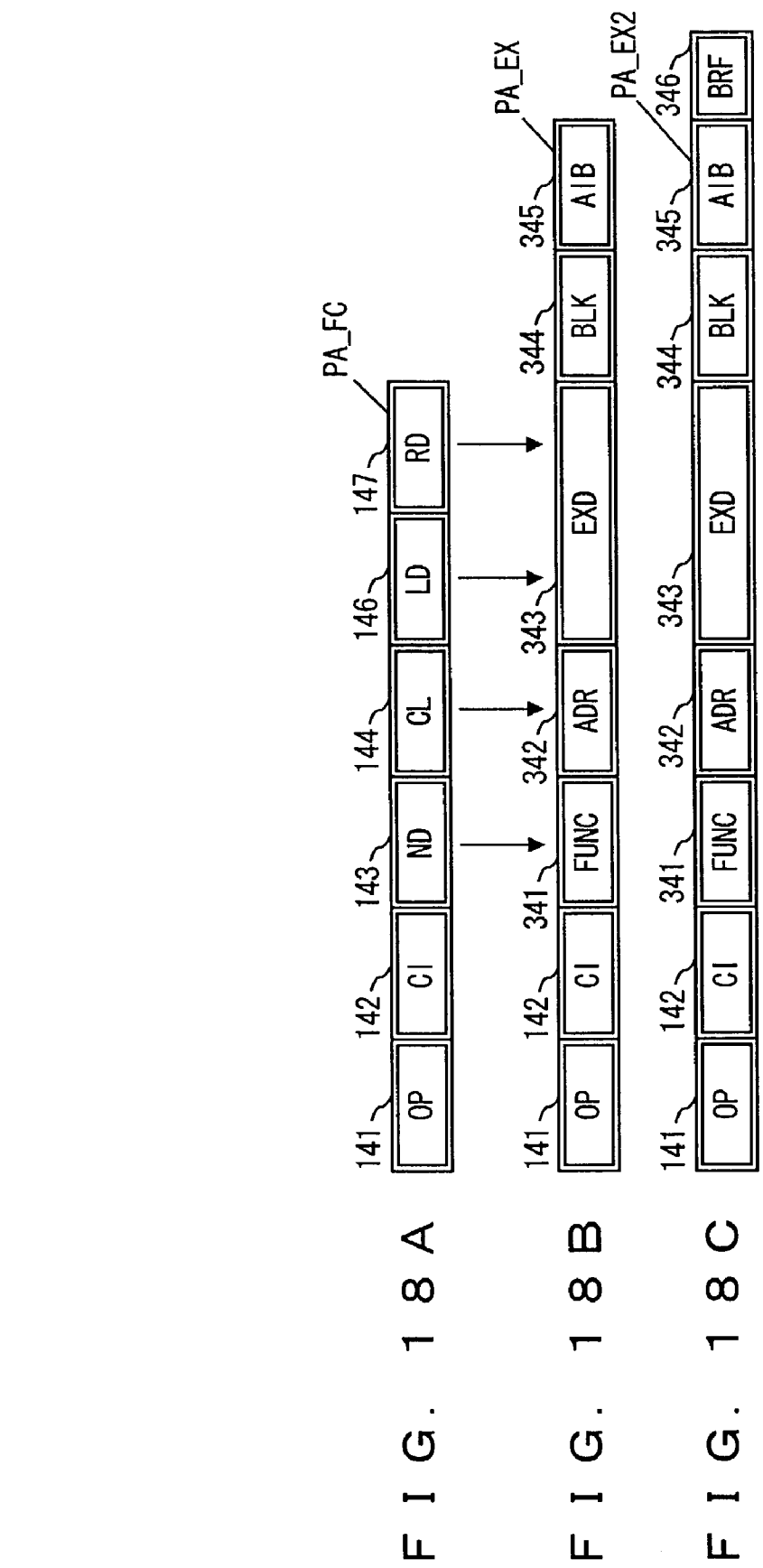
FIGS. 18A–18C illustrate packets for use in the external memory control unit 51 in the fourth embodiment.

FIGS. 18A–18C illustrate packets for use in external memory control unit 51 of the fourth embodiment. FIG. 18A shows a configuration of packet PA_FC being input from firing control unit 122 to external memory control unit 51 and packet PA_FC output from external memory control unit 51 to operating unit 127. This packet PA_FC has the same configuration as the conventional packet PA_FC shown in FIG. 2C, so that detailed description thereof is not repeated.

FIG. 18B shows a configuration of packet PA_EX flowing within external memory control unit 51. This packet PA_EX includes a field 141 in which instruction code OP is stored, a field 142 in which core number CI is stored, a field 341 in which a function code FUNC is stored, a field 342 in which an address ADR is stored, a field 343 in which data EXD is stored, a field 344 in which block number BLK is stored, and a field 345 in which an address in block AIB is stored.

The field 143 for storage of node number ND and the field 144 for storage of color CL in FIG. 18A are replaced with the field 341 for storage of function code FUNC and the field 342 for storage of address ADR in FIG. 18B. Their physical bit widths are the same with each other. The field 146 for storage of left data LD and the field 147 for storage of right data RD in FIG. 18A are replaced with the field 343 for storage of data EXD in FIG. 18B. The total bit widths of left data LD and right data RD is the same as the bit width of data EXD.

FIG. 18C shows a configuration of a packet PA_EX2 flowing within external memory control unit 61 as will be described later. This packet PA_EX2 includes a field 141 in which instruction code OP is stored, a field 142 in which core number CI is stored, a field 341 in which function code FUNC is stored, a field 342 in which address ADR is stored, a field 343 in which data EXD is stored, a field 344 in which block number BLK is stored, a field 345 in which address in block AIB is stored, and a field 346 in which a path branch flag BRF is stored. This packet PA_EX2 corresponds to the packet PA_EX shown in FIG. 18B to which the field 346 for storage of path branch flag BRF has been added.

The read-ahead upload operation of the external memory control unit 51 is now described.

As shown in FIG. 17, cache memory unit 52, external memory interface 53, merge unit 54 and branch unit 55 are connected in a ring shape. When merge unit 54 receives packet PA_FC from firing control unit 122, it sends the packet PA_FC to cache memory unit 52 without alteration.

In receipt of packet PA_FC, cache memory unit 52 generates packet PA_EX from the received packet PA_FC if instruction code OP of the packet PA_FC indicates external memory read. Cache memory unit 52 employs color number CL, left data LD and right data RD to calculate an address of external main memory 25 to access. Cache memory unit 52 determines block number BLK and address in block AIB of cache memory 24 from the calculated address, and stores them in the field 344 for storage of block number BLK and the field 345 for storage of address in block AIB, respectively. The determining manner is the same as described in the first embodiment.

Cache memory unit 52 reads data from cache memory 24 in accordance with the block number BLK and address in block AIB. It stores the read data in packet PA_FC, in the field 146 for storage of left data LD or the field 147 for storage of right data RD, and sends the resultant packet PA_FC to branch unit 55.

If the value of address in block AIB corresponds to the address of the last word on a page of cache memory 24, cache memory unit 52 stores a code indicating an upload request in the field 341 for storage of function code FUNC of packet PA_EX. It adds to the calculated address of external main memory 25 an address offset value corresponding to the degree of read-ahead upload as explained in the second embodiment, and stores the result to the field 342 for storage of address ADR. It then sends the resultant packet PA_EX to branch unit 55.

When branch unit 55 receives packet PA_FC from cache memory unit 52, it sends the packet PA_FC to operating unit 127. When receiving packet PA_EX from cache memory unit 52, branch unit 55 sends the packet PA_EX to external memory interface 53.

External memory interface 53, in receipt of packet PA_EX indicating the upload request, generates a burst read cycle with respect to external main memory 25. It sequentially reads from external main memory 25 the data for one page in accordance with the address values of external main memory 25 indicated by address ADR. External memory interface 53 generates the burst read cycle in synchronization with memory clock MCLK.

External memory interface 53 makes a number of copies of the packet PA_EX necessary for transferring the data for one page read from external main memory 25. External memory interface 53 then stores the data read from external main memory 25 sequentially in the fields 343 for storage of data EXD of respective packets PA_EX. In the fields 345 for storage of addresses in block AIB, it stores values starting from 0 and sequentially incremented as the data are read from external main memory 25. It also stores a code indicating cache write in the fields 141 for storage of instruction code OP. The packets PA_EX thus generated are sequentially sent to merge unit 54.

FIGS. 19A and 19B illustrate packets PA_EX generated when external memory interface 53 is to upload data to cache memory unit 52. FIG. 19A shows packet PA_EX indicating an upload request. The code indicating the upload request is stored in the field 341 for storage of function code FUNC.

FIG. 19B shows a plurality of packets PA_EX generated by external memory interface 53 during the burst read cycle. The code indicating cache write is stored in the fields 141 for storage of instruction code OP. Values starting from 0 and incremented sequentially are stored in the fields 345 for storage of addresses in block AIB.

Merge unit 54, in receipt of packet PA_EX from external memory interface 53, sends the packet PA_EX without alteration to cache memory unit 52. Cache memory unit 52, in receipt of packet PA_EX, writes the data EXD to cache memory 24 at the address designated by block number BLK and address in block AID of packet PA_EX, and erases the packet PA _EX.

The data writing operation to cache memory 24 is performed in response to every packet PA_EX generated in external memory interface 53. The read-ahead upload of data for one page is completed once all the packets PA_EX have been erased in cache memory unit 52.

The storeback operation of external memory control unit 51 is now explained.

Cache memory unit 52 receives packet PA_FC. If the instruction code OP of packet PA_FC indicates external memory write, it generates packet PA_EX from the packet PA_FC. Cache memory unit 52 employs color number CL, left data LD and right data RD to calculate an address of external main memory 25 to access, and stores the calculated address in the field 342 for storage of address ADR. Cache memory unit 52 then determines block number BLK and address in block AIB of cache memory 24 from the calculated address, and stores them in the field 344 for storage of block number BLK and the field 345 for storage of address in block AIB, respectively. The determining manner is the same as described in the first embodiment.

Cache memory unit 52 writes the value of left data LD of packet PA_FC to cache memory 24 in accordance with the block number BLK and address in block AIB, and sends the packet PA_FC to branch unit 55.

If the value of address in block AIB corresponds to the address of the last word on a page of cache memory 24, cache memory unit 52 stores a code indicating a storeback request in the field 341 for storage of function code FUNC of packet PA_EX, and sends the packet PA_EX to branch unit 55.

Branch unit 55, when receiving packet PA_FC from cache memory unit 52, sends the packet PA_FC to operating unit 127. When receiving packet PA_EX from cache memory unit 52, branch unit 55 sends the packet PA_EX to external memory interface 53.

External memory interface 53, in receipt of packet PA_EX indicating the storeback request, makes a number of copies of the packet PA EX necessary for transferring the data of one page. In the respective packets PA_EX, external memory interface 53 stores values sequentially incremented from 0 in the fields 345 for storage of addresses in block AIB, and stores the code indicating cache read in the fields 141 for storage of instruction code OP. Packets PA_EX thus generated are sequentially sent to merge unit 54.

Merge unit 54, in receipt of packet PA_EX from external memory interface 53, sends the packet PA_EX without alteration to cache memory unit 52. Cache memory unit 52, in receipt of packet PA_EX, reads data from cache memory 24 at the address designated by block number BLK and address in block AIB of packet PA_EX, and stores the read data in the field 343 for storage of data EXD.

Cache memory unit 52 stores a code indicating the cache read result in the field 341 for storage of function code FUNC of packet PA_EX, and sends the packet PA_EX to branch unit 55. Branch unit 55, in receipt of packet PA_EX from cache memory unit 52, sends the packet PA_EX without alteration to external memory interface 53.

External memory interface 53, in receipt of the packet PA_EX indicating the cache read result from branch unit 55, generates a burst write cycle with respect to external main memory 25. It writes the data EXD of arriving packets PA_EX sequentially into external main memory 25 in accordance with the addresses of external main memory 25 indicated by address ADR, by sequentially incrementing the address values by 1 at a time. The burst write cycle is performed in synchronization with memory clock MCLK input to external memory interface 53.

When the data writing operation to external main memory 25 is completed, external memory interface 53 erases the relevant packet PA_EX. The data writing operation to external main memory 25 is performed corresponding to every packet PA_EX generated in external memory interface 53. The storeback of data for one page is completed once all the packets PA_EX have been erased from external memory interface 53.

FIGS. 20A–20C illustrate packets PA_EX generated when external memory interface 53 is to store data back to external main memory 25. FIG. 20A shows packet PA_EX indicating a storeback request. The code indicating the storeback request is stored in the field 341 for storage of function code FUNC.

FIG. 20B shows a plurality of packets PA_EX with which external memory interface 53 designates cache read to cache memory unit 52. The code indicating the cache read is stored in the fields 141 for storage of instruction code OP. Values sequentially incremented from 0 are stored in the fields 345 for storage of addresses in block AIB.

FIG. 20C shows a plurality of packets PA_EX in which the data read from cache memory 24 by cache memory unit 52 are stored. The code indicating a cache read result is stored in the fields 341 for storage of function code FUNC, and the data read from cache memory 24 are stored in the fields 343 for storage of data EXD.

As described above, according to the data driven information processor of the present embodiment, if the value of address in block AIB corresponds to the address of the last word on a page of cache memory 24, cache memory unit 52 generates and sends out packet PA_EX including the code indicating the upload request, and external memory interface 53 generates a burst read cycle with respect to external main memory 25 in response to the upload request. External memory interface 53 then stores the data read from external main memory 25 by the burst read cycle sequentially to packets PA_EX and sends out the packets, and cache memory unit 52 writes the data stored in the packets PA_EX sequentially to cache memory 24. Accordingly, it is possible to enjoy the effects of the read-ahead upload operation as explained in the first embodiment while maintaining the configuration of the self-synchronous transfer control circuit performing asynchronous packet transfer.

Further, if the value of address in block AIB corresponds to the address of the last word of a page of cache memory 24, cache memory unit 52 generates and sends out packet PA_EX including the code indicating the storeback request. In response to the storeback request, external memory interface 53 generates and sends out packets PA_EX including the code indicating the cache read by a number necessary for transferring data for one page. Cache memory unit 52 reads data from cache memory 24 in response to the cache read, stores them sequentially in packets PA_EX, and sends out the packets. External memory interface 53 then generates a burst write cycle with respect to external main memory 25, and writes the data stored in packets PA_EX sequentially into the external memory. Accordingly, it is possible to enjoy the effects of the storeback operation as described in the first embodiment while maintaining the configuration of the self-synchronous transfer control circuit performing asynchronous packet transfer.

Fifth Embodiment

The data driven information processor according to the fifth embodiment of the present invention differs from the data driven information processor of the fourth embodiment only in the storeback operation by the cache memory unit and external memory interface of the external memory control unit. Thus, detailed description of the common configurations and functions is not repeated. The external memory control unit, cache memory unit and external memory interface of the present embodiment are denoted by 51a, 52a and 53a, respectively.

Figure 21:
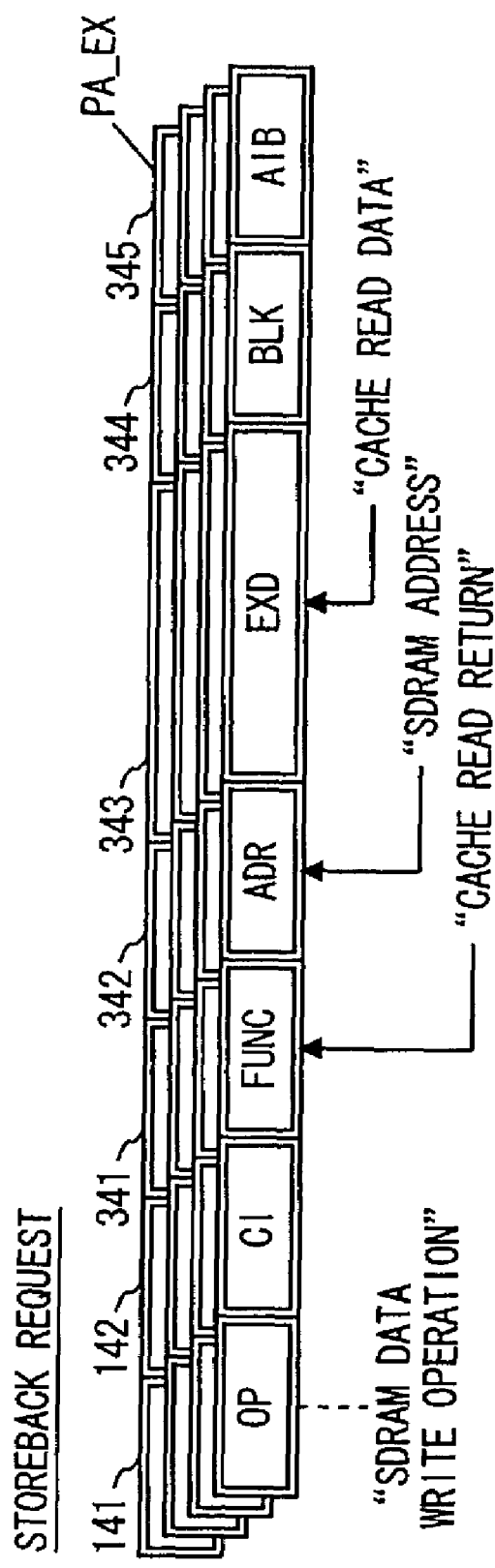

FIG. 21 shows packet PA_EX indicating external memory write that is generated by cache memory unit 52a. The code indicating the external memory data write is stored in the field 141 for storage of instruction code OP. The fields 142 and 341–345 other than the field 141 for storage of instruction code OP are identical to those of packet PA_EX shown in FIG. 20C, and thus, detailed description thereof is not repeated.

Cache memory unit 52a receives packet PA_FC. If the instruction code OP of packet PA_FC indicates the external memory write, it generates packet PA_EX shown in FIG. 18B from the packet PA_FC. Cache memory unit 52a employs color number CL, left data LD and right data RD to calculate an address of external main memory 25 to access, and stores the calculated address in the field 342 for storage of address ADR.

Cache memory unit 52a determines block number BLK and address in block AIB of cache memory 24 from the calculated address, and stores them in the field 344 for storage of block number BLK and the field 345 for storage of address in block AIB, respectively. The determining manner is the same as explained in the first embodiment.

Cache memory unit 52a writes the value of left data LD in cache memory 24 in accordance with block number BLK and address in block AIB, and sends the packet PA_FC to branch unit 55.

Next, if the value of address in block AIB corresponds to the address of the last word on a page of cache memory 24, cache memory unit 52a stores a code indicating a cache read result in the field 341 for storage of function code FUNC of packet PA_EX, and makes a number of copies of the packet PA_EX necessary for transferring the data of one page. Cache memory unit 52a then stores the data for one page read from cache memory 24 sequentially in the fields 343 for storage of data EXD of the packets PA_EX, and sends the packets to branch unit 55.

Branch unit 55, when receiving packet PA_FC from cache memory unit 52a, sends the packet PA_FC to operating unit 127. When receiving packet PA_EX from cache memory unit 52a, branch unit 55 sends the packet PA_EX to external memory interface 53a.

External memory interface 53a, in receipt of the packet PA_EX indicating the cache read result, generates a burst write cycle with respect to external main memory 25. It writes the data EXD of arriving packets PA_EX sequentially into external main memory 25 in accordance with the addresses of external main memory 25 indicated by address ADR, by sequentially incrementing the address values by 1 at a time. The burst write cycle is performed in synchronization with memory clock MCLK input to external memory interface 53a.

When the data writing operation with respect to external main memory 25 is completed, external memory interface 53a erases the relevant packet PA_EX. The data writing operation to external main memory 25 is performed corresponding to every packet PA_EX generated in cache memory unit 52a. The storeback of data of one page is completed once all the packets PA_EX have been erased from external memory interface 53a.

As described above, according to the data driven information processor of the present embodiment, if the value of address in block AIB corresponds to the address of the last word on a page of cache memory 24, cache memory unit 52a reads data of one page from cache memory 24 and stores them sequentially in packets PA_EX and sends out the packets. External memory interface 53a generates a burst write cycle with respect to external main memory 25, and writes the data stored in packets PA_EX sequentially to external main memory 25. Thus, it is possible to enjoy the effects of the storeback operation as explained in the first embodiment while maintaining the configuration of the self-synchronous transfer control circuit performing asynchronous packet transfer.

Sixth Embodiment

The data driven information processor of the sixth embodiment of the present invention differs from the data driven information processor of the fourth embodiment only in the functions of cache memory unit 52 and external memory interface 53 in external memory control unit 51 shown in FIG. 17. Thus, detailed description of the common configurations and functions is not repeated. The external memory control unit, cache memory unit and external memory interface of the present embodiment are denoted by 51b, 52b and 53b, respectively.

Figure 22:
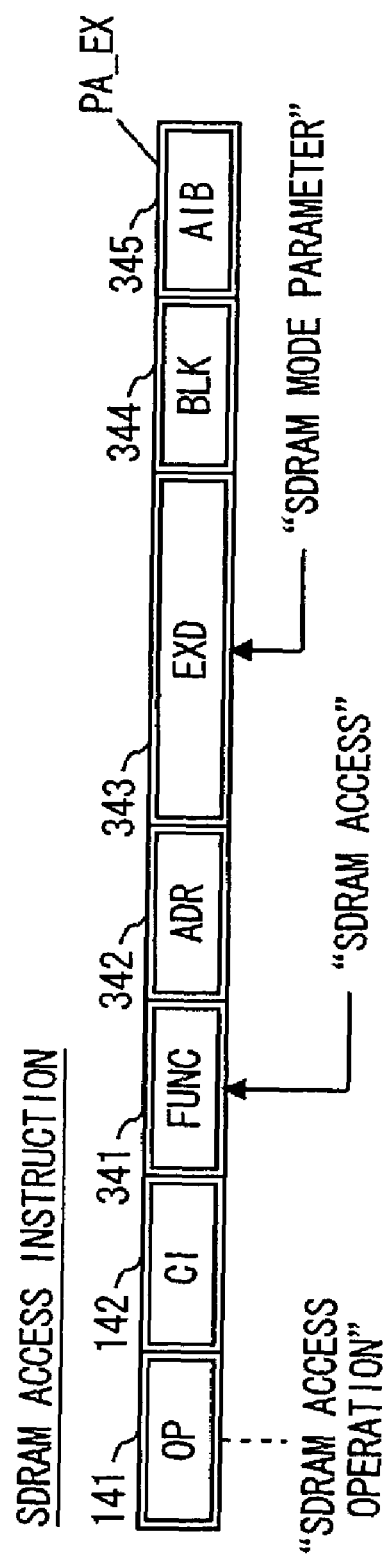
FIG. 22 illustrates a packet PA_EX indicating the external memory access operation, generated by the cache memory unit 52b.

FIG. 22 shows packet PA_EX indicating an external memory access operation that is generated by cache memory unit 52b. The content of the operation to be performed by external memory interface 53b with respect to external main memory 25 is stored in the field 341 for storage of function code FUNC. An external memory mode parameter to be applied to external memory 25 is stored in the field 343 for storage of data EXD. The other fields 141, 142, 342, 344 and 345 are identical to those of packet PA_EX shown in FIG. 18B, so that detailed description thereof is not repeated.

The external memory access operation includes, e.g., precharge or setting of an operation mode of external main memory 25 performed by external memory interface 53b via external memory port TM.

Cache memory unit 52b receives packet PA_FC. When instruction code OP of packet PA_FC indicates external memory access, it generates packet PA_EX as shown in FIG. 22 from the packet PA_FC. Cache memory unit 52b stores the code indicating the operation content to be performed by external memory interface 53b on external main memory 25 in the field 341 for storage of function code FUNC. Cache memory unit 52b stores an external memory mode parameter to be applied to external main memory 25 in the field 343 for storage of data EXD. Cache memory unit 52b then sends the packet PA_EX to branch unit 55.

Branch unit 55, in receipt of packet PA_EX from cache memory unit 52b, sends the packet PA_EX to external memory interface 53b.

External memory interface 53b, in receipt of the packet PA_EX indicating the external memory access operation, refers to function code FUNC and data EXD to perform an external memory access operation with respect to external main memory 25. Since external memory interface 53b is connected with a control signal input line and a data input line of external main memory 25 via external memory port TM, it employs these signal lines to write the value of data EXD to external main memory 25 as the mode setting parameter. External memory interface 53b erases the packet PA_EX once it completes the writing operation of the mode setting parameter to external main memory 25.

As described above, according to the data driven information processor of the present embodiment, cache memory unit 52b, in receipt of packet PA_FC indicating the external memory access, generates and sends out packet PA_EX including the operation content to be performed by external memory interface 53b with respect to external main memory 25 and the external memory mode parameter. External memory interface 53b, in response to the external memory access operation designated, writes the mode setting parameter to external main memory 25. Accordingly, it is possible to perform setting of an access mode of external main memory 25 and others while maintaining the configuration of the self-synchronous transfer control circuit performing asynchronous packet transfer.

Seventh Embodiment

The data driven information processor according to the seventh embodiment of the present invention is identical to the data driven information processor of the fourth embodiment except the read-ahead upload operation in cache memory unit 52 of external memory control unit 51 shown in FIG. 17. Thus, detailed description of the common configurations and functions is not repeated. The external memory control unit and cache memory unit of the present embodiment are denoted by 51c and 52c, respectively. Packets PA_EX for use in the present embodiment are identical to the packets PA_EX shown in FIGS. 19A and 19B, so that detailed description thereof is not repeated.

Cache memory unit 52c receives packet PA_FC. When instruction code OP of packet PA_FC indicates external memory read with forcible upload, it generates packet PA_EX as shown in FIG. 18B from packet PA_FC. Cache memory unit 52c employs color number CL, left data LD and right data RD to calculate an address of external main memory 25 to access, and stores the calculated address in the field 342 for storage of address ADR.

Cache memory unit 52c determines block number BLK and address in block AIB of cache memory 24 from the calculated address, and stores them in the field 344 for storage of block number BLK and the field 345 for storage of address in block AIB. The determining manner is the same as described in the first embodiment.

Cache memory unit 52c reads data from cache memory 24 in accordance with block number BLK and address in block AIB, and stores the read data in packet PA_FC, in the field 146 for storage of left data LD or the field 147 for storage of right data RD, and sends the resultant packet PA_FC to branch unit 55.

Next, cache memory unit 52c stores a code indicating an upload request in the field 341 for storage of function code FUNC of packet PA_EX unconditionally, regardless of whether the value of address in block AIB corresponds to the address of the last word on a page of cache memory 24. It then sends the resultant packet PA_EX to branch unit 55.

The subsequent operations are the same as in the read-ahead upload operation described in the fourth embodiment, and thus, detailed description thereof is not repeated.

As described above, according to the data driven information processor of the present embodiment, cache memory unit 52c generates packet PA_EX including the code indicating the upload request, regardless of whether the value of address in block AIB corresponds to the address of the last word on a page of cache memory 24, and sends the packet PA_EX to external memory interface 53. Thus, in addition to the benefits as described in the fourth embodiment, the read-ahead upload operation can be performed at an arbitrary timing.

Eighth Embodiment

The data driven information processor according to the eighth embodiment of the present invention is identical to the data driven information processor of the fourth embodiment except the storeback operation in cache memory unit 52 of external memory control unit 51 shown in FIG. 17. Thus, detailed description of the common configurations and functions is not repeated. The external memory control unit and the cache memory unit of the present embodiment are denoted by 51d and 52d, respectively. The packets PA_EX for use in the present embodiment are identical to the packets PA_EX shown in FIGS. 19A and 19B, so that detailed description thereof is not repeated.

Cache memory unit 52d receives packet PA_FC. If instruction code OP of packet PA_FC indicates external memory write with forcible storeback, it generates packet PA_EX as shown in FIG. 18B from the packet PA_FC. Cache memory unit 52d employs color number CL, left data LD and right data RD to calculate an address of external main memory 25 to access, and stores the calculated address in the field 342 for storage of address ADR.

Cache memory unit 52d then determines block number BLK and address in block AIB of cache memory 24 from the calculated address, and stores them in the field 344 for storage of block number BLK and the field 345 for storage of address in block AIB, respectively. The determining manner is the same as described in the first embodiment.

Cache memory unit 52d writes the value of left data LD of packet PA_FC into cache memory 24 in accordance with block number BLK and address in block AIB, and sends the packet PA_FC to branch unit 55.

Next, cache memory unit 52d unconditionally stores a code indicating a storeback request in the field 341 for storage of function code FUNC of packet PA_EX, regardless of whether the value of address in block AIB corresponds to the address of the last word on a page of cache memory 24, and sends the packet PA_EX to branch unit 55.

The subsequent operations are the same as in the storeback operation described in the fourth embodiment, and thus, detailed description thereof is not repeated.

As described above, according to the data driven information processor of the present embodiment, cache memory unit 52d generates packet PA_EX including the code indicating the storeback request, regardless of whether the value of address in block AIB corresponds to the address of the last word of a page of cache memory 24, and sends it to external memory interface 53. Thus, in addition to the effects as described in the fourth embodiment, the storeback operation can be performed at an arbitrary timing.

Ninth Embodiment

The data driven information processor according to the ninth embodiment of the present invention is identical to data driven information processor 1 of the first embodiment shown in FIGS. 7–10, except the configuration and function of the external memory control unit. Thus, detailed description of the common configurations and functions is not repeated. The external memory control unit of the present embodiment is denoted by 61.

Figure 23:
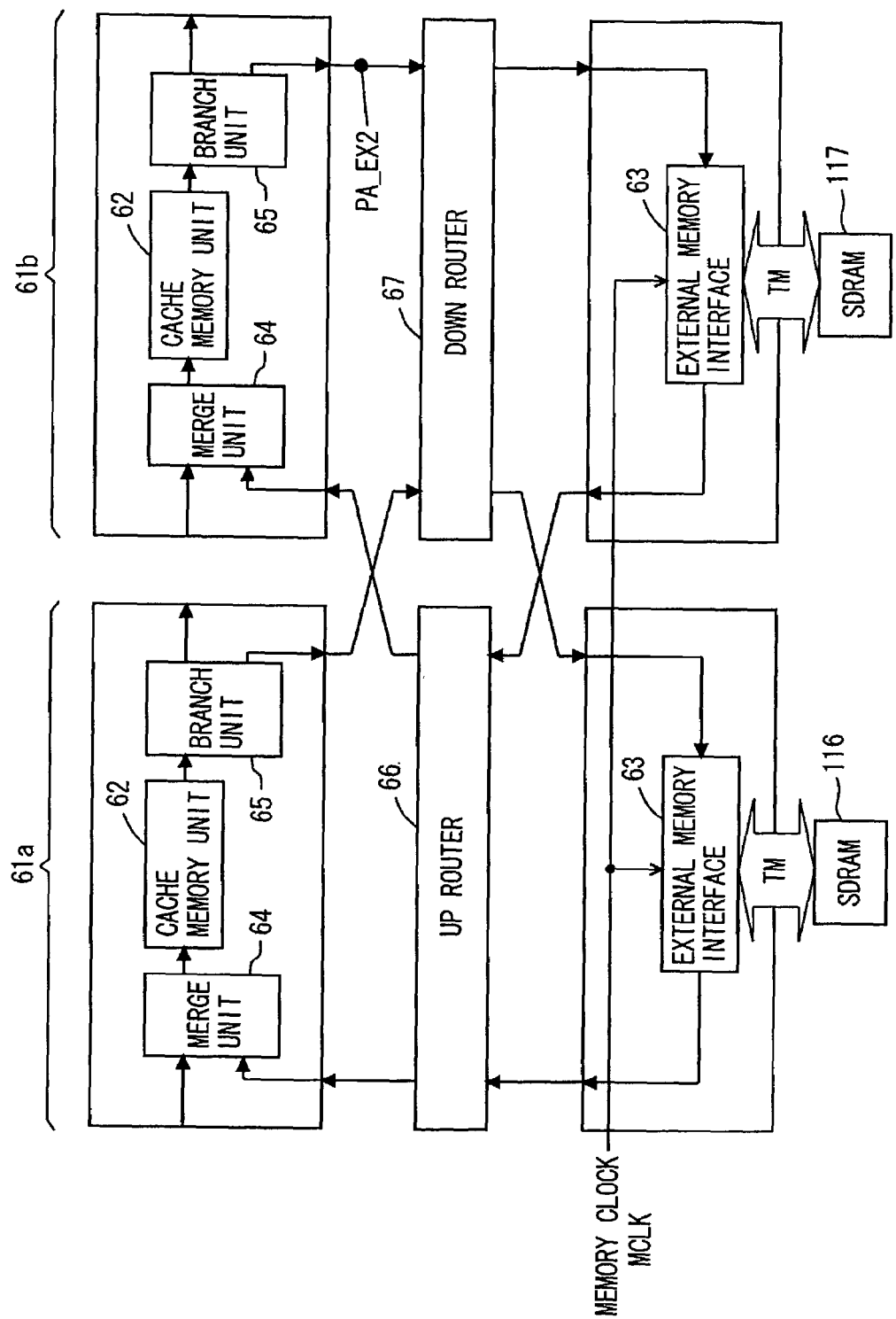
FIG. 23 is a block diagram showing a schematic configuration of the external memory control unit 61 according to a ninth embodiment of the present invention.

FIG. 23 is a block diagram showing a schematic configuration of the external memory control unit 61 of the ninth embodiment. As shown in FIG. 23, external memory control units 61a and 61b operate independently from each other. The two external memory control units are collectively denoted by 61, since they are the same in configuration and function.

External memory control unit 61 includes a cache memory unit 62, an external memory interface 63 connected to an SDRAM 116 or 117 via an external memory port TM, a merge unit 64, and a branch unit 65. Packet PA_EX2 output from external memory interface 63 within external memory control unit 61 is input to an up router 66, and packet PA_EX2 output from up router 66 is input to merge unit 64 of external memory control unit 61. Packet PA_EX2 output from branch unit 65 within external memory control unit 61 is input to a down router 67, and packet PA_EX2 output from down router 67 is input to external memory interface 63 of external memory control unit 61.

External memory interface 63 receives memory dock MCLK. This memory clock MCLK is an operating base clock of external main memory 25, and external main memory 25 performs high-speed access in synchronization with memory clock MCLK.

Merge unit 64, cache memory unit 62, branch unit 65, down router 67, external memory interface 63 and up router 66 are connected in a ring shape, and packet PA_EX2 described in conjunction with FIG. 18C flows through the ring-like path. The path branch flag BRF included in packet PA_EX2 is added by cache memory unit 62, and referred to as the packet branch condition by down router 67.

Up router 66 and down router 67 are provided, when a plurality of external memory control units 61 constitute a data driven information processor, such that upload or storeback can be done with every cache memory unit 62 and every external main memory 25 (SDRAM 116, 117) in any combination.

Up router 66 can receive packet PA_EX2 from any external memory interface 63, and selects one of all the cache memory units 62 to transfer the packet PA_EX2 in accordance with the value of core number CI in the received packet PA_EX. Down router 67 can receive packet PA_EX2 from any branch unit 65 and selects one of all the memory interfaces 63 to transfer the packet PA_EX2 in accordance with the value of path branch flag BRF in the received packet PA_EX2.

Cache memory unit 62 adds path branch flag BRF to packet PA_EX2 in an unspecified manner. Whether packet PA_EX2 is transferred from cache memory unit 62 through branch unit 65 and down router 67 to one external memory interface 63 or to the other, up router 66 refers to the core number CI of the relevant packet PA_EX2 to select the output path, so that it always returns to the cache memory unit 62 that originally sent out the packet.

The operations of external memory interface 63, merge unit 64 and branch unit 65 are the same as those of the external memory interface 53, merge unit 54 and branch unit 55 in the fourth embodiment described in conjunction with FIG. 17. Thus, detailed description thereof is not repeated.

As described above, according to the data driven information processor of the present embodiment, a plurality of external memory control units 61 are connected via up router 66 and down router 67. This allows every cache memory unit 62 to access any external main memory 25, and thus, cache memory unit 62 can perform upload or storeback even with respect to external main memory 25 unconnected to the corresponding external memory interface 63.

Further, it is possible to establish a data driven type information processing system permitting every processing core therein to access one and the same external main memory 25 that is connected to any one of a plurality of external memory interfaces 63.

Tenth Embodiment

Figure 24:
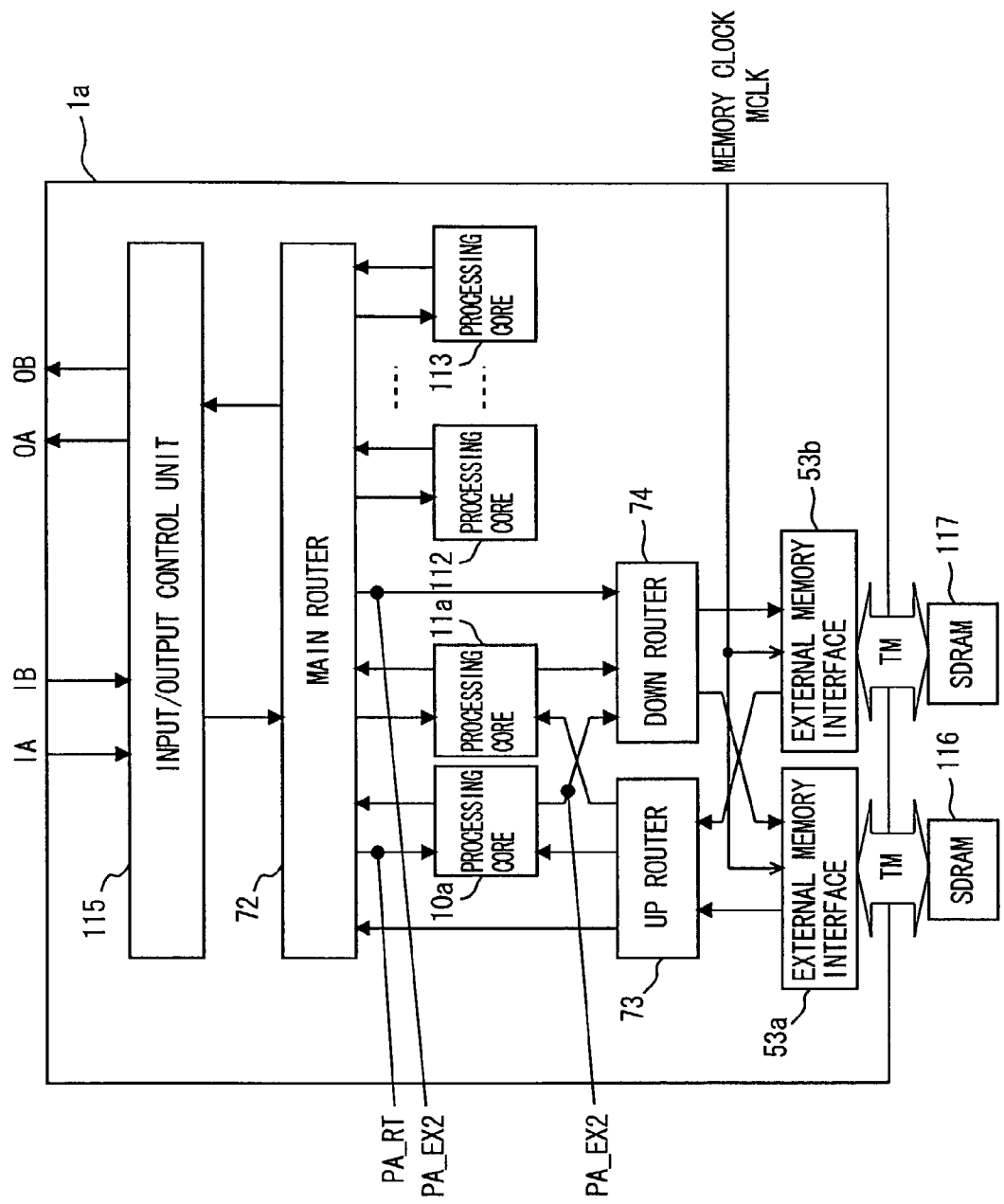
FIG. 24 is a block diagram showing a schematic configuration of the data driven information processor 1a according to a tenth embodiment of the present invention.

FIG. 24 is a block diagram showing a schematic configuration of the data driven information processor 1a according to the tenth embodiment of the present invention. Data driven information processor 1a includes: a plurality of processing cores 10a and 11a each having access to an external main memory 25 (SDRAM 116, 117); a plurality of external memory interfaces 53a and 53b each connected to external main memory 25 via an external memory port TM; a main router 72; an up router 73; a down router 74; processing cores 112 and 113 not having access to external main memory 25; and an input/output control unit 115.

External memory interfaces 53a and 53b receive memory clock MCLK. This memory clock MCLK is an operating base clock of external main memory 25, and external main memory 25 performs high-speed access in synchronization with memory clock MCLK. External memory interfaces 53a and 53b perform the same operations as the external memory interface 53 of the fourth embodiment.

Processing core 10a or 10b, down router 74, external memory interface 53a or 53b, and up router 73 are connected in a ring shape. Packet PA_EX2 described in conjunction with FIG. 18C flows through this ring-like path. Path branch flag BRF is added to packet PA_EX2 by processing core 10a or 10b, and is referred to by down router 74 as the packet branch condition.

Figure 25:
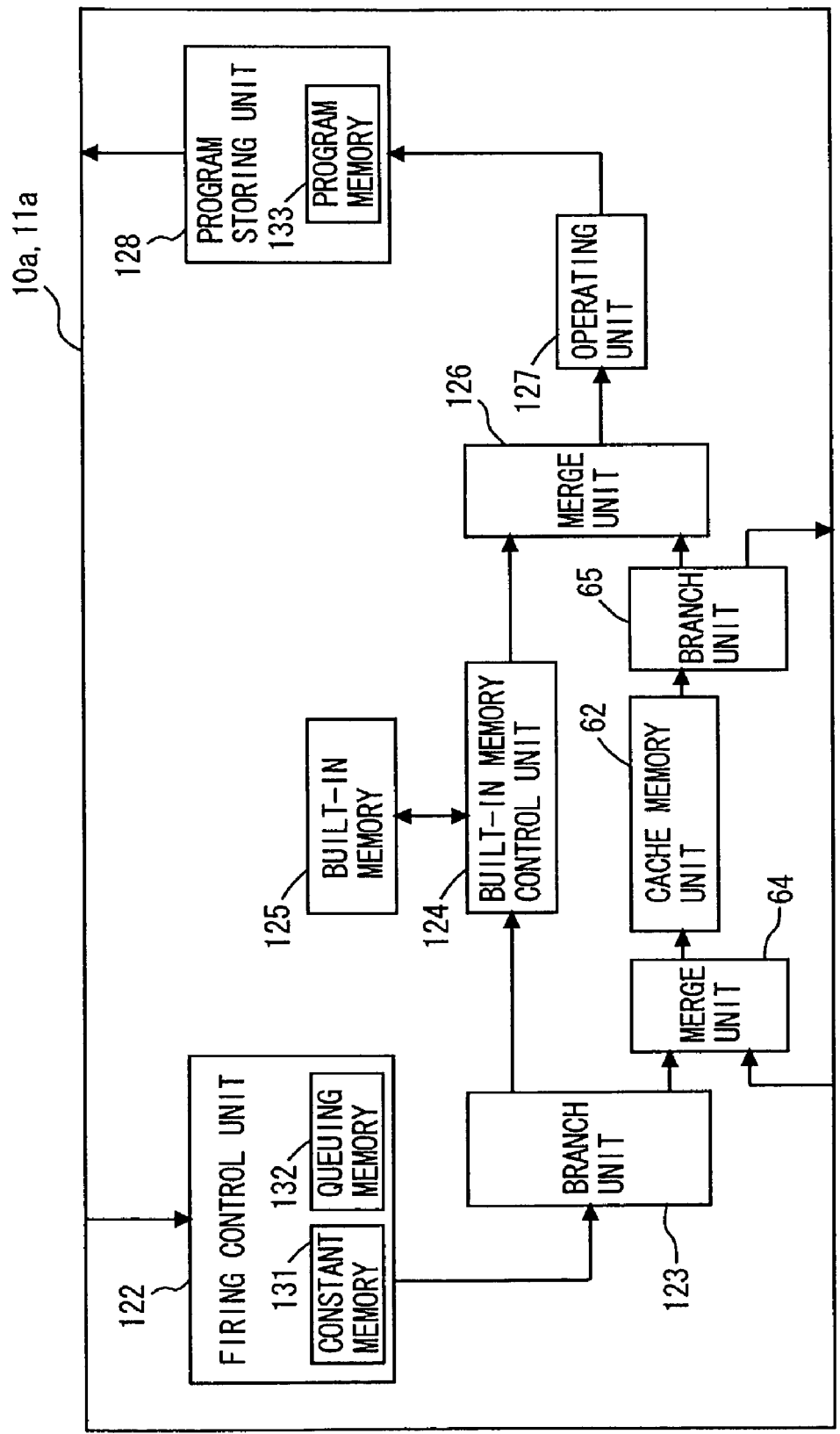
FIG. 25 is a block diagram showing a schematic configuration of the processing core 10a, 11a in the tenth embodiment.

FIG. 25 is a block diagram showing a schematic configuration of the respective processing cores 10a and 11a of the tenth embodiment. Processing cores 10a and 11a of the present embodiment are identical to processing cores 10 and 11 of the first embodiment shown in FIG. 9 except that external memory control unit 21 connected to external memory port TM is replaced with a cache memory unit 62, a merge unit 64 is provided between branch unit 123 and cache memory unit 62, and a branch unit 65 is provided between cache memory unit 62 and merge unit 126. Thus, detailed description of the common configurations and functions is not repeated. The cache memory unit 62, merge unit 64 and branch unit 65 perform the same operations as cache memory unit 62, merge unit 64 and branch unit 65 of the ninth embodiment shown in FIG. 23.

Main router 72, in receipt of packet PA_RT from input/output control unit 115, refers to core number CI of packet PA_RT and determines where to transfer the packet PA_RT. If packet PA_RT is to be transferred to external memory interface 53a or 53b, main router 72 generates a packet PA_EX2 from packet PA_RT and sends it to down router 74.

More specifically, main router 72 stores function code FUNC in the field 143 for storage of node number ND, stores an address ADR calculated from color CL and data D in the field 144 for storage of color CL, stores data EXD in the field 145 for storage of data D, stores dummy values in the field 344 for storage of block number BLK and the field 345 for storage of address in block AIB, and stores a value determined by a prescribed determining manner in the field 346 for storage of path branch flag BRF. Instruction code OP and core number CI of packet PA_RT are used without alternation in packet PA_EX2.

Down router 74, in receipt of packet PA_EX2, refers to path branch flag BRF of packet PA_EX2 and selects either external memory interface 53a or 53b to transfer packet PA_EX2 thereto. The operation of down router 74 when it receives packet PA_EX2 from processing core 10a or 11a is the same as the operation of down router 67 in the ninth embodiment shown in FIG. 23, and thus, detailed description thereof is not repeated.

Up router 73, in receipt of packet PA_EX2, refers to core number CI of packet PA_EX2, and selects one of processing cores 10a, 11a and main router 72 to transfer packet PA_EX2 thereto. The operation of up router 73 when transferring packet PA_EX2 to processing core 10a or 11a is the same as the operation of up router 67 in the ninth embodiment shown in FIG. 23, so that detailed description thereof is not repeated.

As described above, according to the data driven information processor of the present embodiment, a plurality of external memory interface units 53a and 53b are connected by up router 73 and down router 74, so that every cache memory unit 62 is allowed to access any external main memory 25. Cache memory unit 62 can perform upload or storeback with respect to even external main memory 25 unconnected to the corresponding external memory interface 53a or 53b.

Further, it is possible to establish the data driven type information processing system permitting every processing core therein to access one and the same external main memory 25 that is connected to any one of a plurality of external memory interfaces.

Eleventh Embodiment

Figure 26:
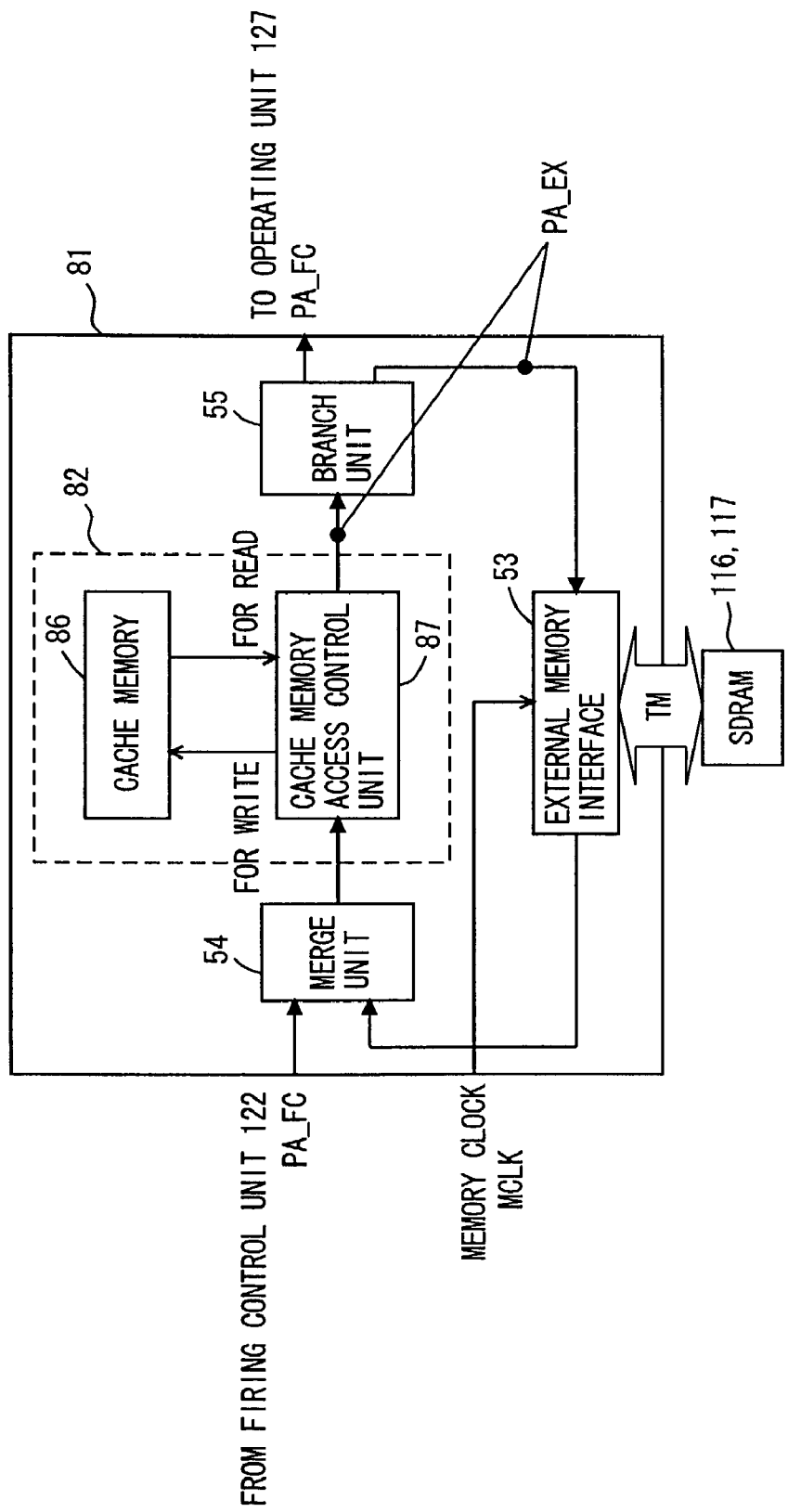
FIG. 26 is a block diagram showing a schematic configuration of the external memory control unit 81 according to an eleventh embodiment of the present invention.

FIG. 26 is a block diagram showing a schematic configuration of the external memory control unit 81 according to the eleventh embodiment of the present invention. This external memory control unit 81 includes a cache memory unit 82, an external memory interface 53 connected to an SDRAM 116 or 117 via an external memory port TM, a merge unit 54, and a branch unit 55. The external memory control unit 81 of the present embodiment is identical to external memory control unit 51 of the fourth embodiment shown in FIG. 17 except the configuration and function of cache memory unit 82, and thus, detailed description of the common configurations and functions is not repeated.

Cache memory unit 82 includes a cache memory 86 and a cache memory access control unit 87. Cache memory 86 has its entire region divided into blocks and pages as in the case of cache memory unit 52 of the fourth embodiment shown in FIG. 17. Cache memory access control unit 87 performs the cache access processing as in cache memory unit 52 of the fourth embodiment in FIG. 17.

Cache memory 86 and cache memory access control unit 87 are connected to each other by a data read line and a data write line. Cache memory access control unit 87 employs the data read line or the data write line to access cache memory 86 in response to instruction code OP included in packet PA_EX. The instructions indicated by instruction code OP include the above-described external memory read, external memory write, external memory access, external memory read with forcible upload, external memory write with forcible storeback, and other instructions related to execution of operations.

As described above, according to the data driven information processor of the present embodiment, cache memory access control unit 87 accesses cache memory 86 employing a set of data read line and data write line in accordance with instruction code OP. Accordingly, even a cache memory having only one set of data read line and data write line can perform both the cache memory access related to execution of an operation and the cache memory access related to data exchange.

Twelfth Embodiment

Figure 27:
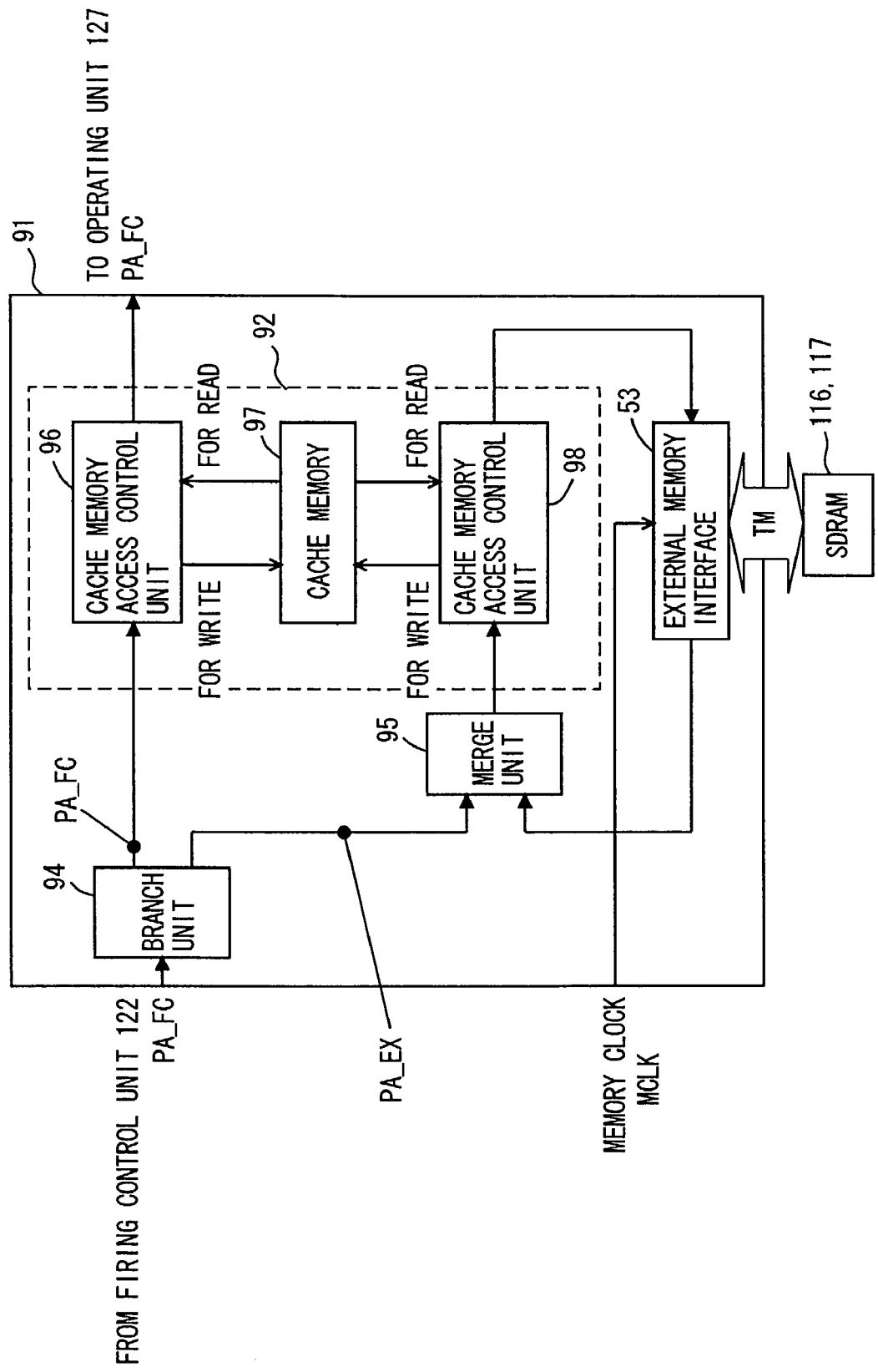
FIG. 27 is a block diagram showing a schematic configuration of the external memory control unit 91 according to a twelfth embodiment of the present invention.

FIG. 27 is a block diagram showing a schematic configuration of the external memory control unit 91 according to the twelfth embodiment of the present invention. This external memory control unit 91 includes a cache memory unit 92, an external memory interface 53 connected to an SDRAM 116 or 117 via an external memory port TM, a branch unit 94, and a merge unit 95. The external memory interface 53 of the present embodiment is identical to the external memory interface 53 of the fourth embodiment shown in FIG. 17.

Cache memory unit 92 includes cache memory access control units 96 and 98 and a cache memory 97. Cache memory 97 has its entire region divided into blocks and pages, as in the cache memory unit 52 of the fourth embodiment shown in FIG. 17.

Cache memory 97 and cache memory access control unit 96 are connected to each other by a data read line and a data write line. Similarly, cache memory 97 and cache memory access control unit 98 are connected to each other by a data read line and a data write line. Cache memory access control units 96 and 98 each access cache memory 97 via the data read line or the data write line in accordance with instruction code OP included in packet PA_EX. In other words, cache memory 97 has two sets of data read line and data write line, and is accessible from both cache memory access control units 96 and 98.

Branch unit 94, in receipt of packet PA_FC from firing control unit 122, sends the packet PA_FC without alteration to cache memory access control unit 96. Branch unit 94 also generates packet PA_EX from the packet PA_FC and sends it to merge unit 95. The packet PA_EX is generated in the same manner as described above.

Cache memory access control unit 96 performs the cache memory access related to execution of an operation of data driven information processor 1. Cache memory access control unit 98 performs the cache memory access related to data exchange between cache memory 97 and external main memory 25.

If instruction code OP of packet PA_FC indicates external memory read or external memory write, cache memory access control unit 96 employs color number CL, left data LD and right data RD to calculate an address of external main memory 25 to access. Cache memory access control unit 96 determines block number BLK and address in block AIB of cache memory 97 from the calculated address, and stores them in the field 344 for storage of block number BLK and the field 345 for storage of address in block AIB, respectively, of packet PA_EX.

Cache memory access control unit 96 performs the data read or the data write with respect to cache memory 97 in accordance with block number BLK and address in block AIB using the data read line or the data write line. In the case of the data read, it stores the read data in the field 146 for storage of left data LD or the field 147 for storage of right data RD of packet PA_FC, and sends the packet PA_FC to operating unit 127.

Cache memory access control unit 98, in receipt of packet PA_EX, performs the read-ahead upload operation or the storeback operation as described above, according to whether packet PA_EX indicates the upload request or the storeback request. At this time, cache memory access control unit 98 employs the data read line or the data write line to perform the data read or the data write with respect to cache memory 97.

As described above, cache memory access control unit 96 performs the cache memory accesses related to execution of operations of data driven information processor 1, and cache memory access control unit 98 performs the cache memory accesses related to data exchange between cache memory 97 and external main memory 25. This permits separation of the paths for packets PA_FC (the cache memory accesses for the execution of operations) and for packets PA_EX (the cache memory accesses for the data exchange), and accordingly, it is possible to make the packet transfer rate equal to the maximum transfer rate of the hardware.

Thirteenth Embodiment

Figure 28:
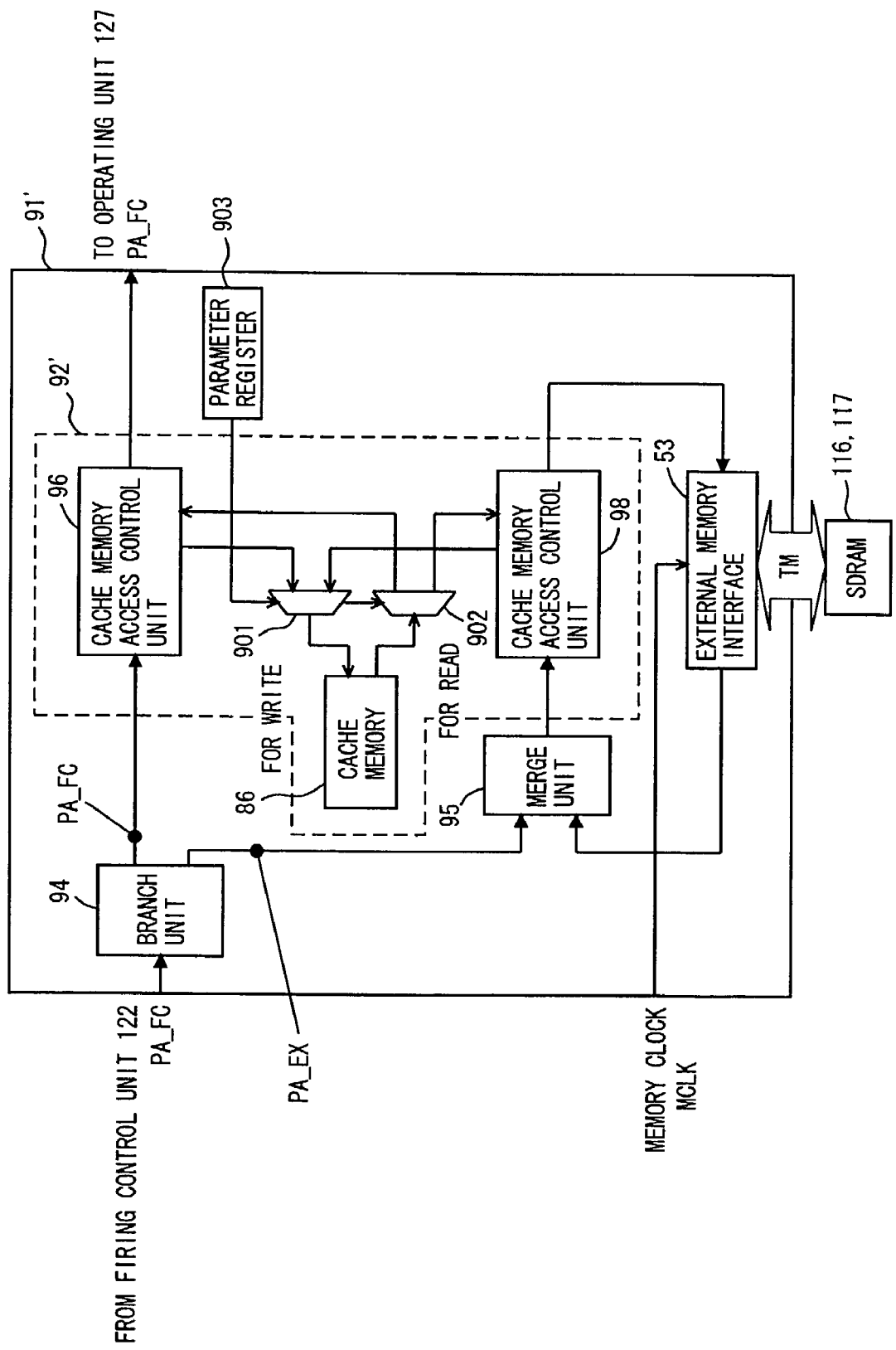
FIG. 28 is a block diagram showing a schematic configuration of the external memory control unit 91' according to a thirteenth embodiment of the present invention.

FIG. 28 is a block diagram showing a schematic configuration of the external memory control unit 91' according to the thirteenth embodiment of the present invention. This external memory control unit 91' is identical to the external memory control unit 91 of the twelfth embodiment in FIG. 27 except that cache memory unit 92 is replaced with a cache memory unit 92' and that a parameter register 903 is additionally provided. Thus, detailed description of the common configurations and functions will not be repeated.

Cache memory unit 92' includes cache memory access control units 96 and 98, a cache memory 86, a multiplexer 901, and a demultiplexer 902. Cache memory access control units 96 and 98 are the same as the cache memory access control units 96 and 98 of the eleventh embodiment in FIG. 21. Cache memory 86 has only one set of data read line and data write line.

Parameter register 903 stores information of two bits indicating which to make valid, the data read and write lines of cache memory access control unit 96 or those of cache memory access control unit 98. Multiplexer 901 and demultiplexer 902 switch the data read line and the data write line according to the 2-bit information stored in parameter register 903, and connects cache memory 86 with cache memory access control unit 96 or 98. The 2-bit information stored in parameter register 903 is updated dynamically in accordance with instruction code OP of packet PA_FC arriving at cache memory access control unit 96.

As described above, according to the data driven information processor of the present embodiment, multiplexer 901 and demultiplexer 902 switch the data read line and the data write line in accordance with information of two bits stored in parameter register 903. Thus, it is possible to enjoy the same effects as described in the twelfth embodiment even with a cache memory having only one set of data read line and data write line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An external memory control device for use in a data driven type information processing apparatus performing processing while storing a copy of a portion of data stored in an external memory in a cache memory, comprising:
   an external memory interface regularly reading ahead data from said external memory at a prescribed timing; and
   a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory.

2. The external memory control device according to claim 1, wherein said cache memory unit, when reading data from a prescribed region of said cache memory in accordance with a data read request with respect to said external memory, generates a first packet including an upload request to send to said external memory interface, said external memory interface generates a plurality of second packets including the data read from said external memory in accordance with said upload request to send to said cache memory unit, and said cache memory unit stores the data included in said plurality of second packets in said cache memory.

3. The external memory control device according to claim 1, wherein when said cache memory unit receives an external memory read request with forcible upload, said external memory interface reads ahead data from said external memory.

4. The external memory control device according to claim 1, wherein when said cache memory unit writes data to a prescribed region of said cache memory in accordance with a data write request with respect to said external memory, said external memory interface stores data stored in said cache memory back into said external memory.

5. The external memory control device according to claim 1, wherein said cache memory unit, when writing data to a prescribed region of said cache memory in accordance with a data write request with respect to said external memory, generates a plurality of packets including data read from said cache memory to send to said external memory interface, and said external memory interface stores the data included in said plurality of packets back into said external memory.

6. The external memory control device according to claim 1, wherein when said cache memory unit receives an external memory write request with forcible storeback, said external memory interface stores data back into said external memory.

7. The external memory control device according to claim 1, wherein said cache memory unit generates a packet including a mode setting parameter of said external memory in accordance with an external memory access operation request, to send to said external memory interface, and said external memory interface sets the mode setting parameter included in said packet to said external memory.

8. The external memory control device according to claim 1, wherein said cache memory has a set of data read line and data write line, and said cache memory unit includes a cache memory access control unit which accesses said cache memory using said set of data read line and data write line in accordance with the data access request with respect to said external memory to regularly read ahead data from said external memory at the prescribed timing, and stores said read ahead data in said cache memory using said set of data read line and data write line.

9. An external memory control device for use in a data driven type information processing apparatus performing processing while storing a copy of a portion of data stored in an external memory in a cache memory, comprising:

an external memory interface regularly reading ahead data from said external memory at a prescribed timing; and a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory, and wherein when said cache memory unit reads the last word of a page of said cache memory in accordance with a data read request with respect to said external memory, said external memory interface reads ahead data of a prescribed number of pages ahead of said page from said external memory.

10. An external memory control device for use in a data driven type information processing apparatus performing processing while storing a copy of a portion of data stored in an external memory in a cache memory, comprising:

an external memory interface regularly reading ahead data from said external memory at a prescribed timing;

a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory; and a register storing information about a degree of said read-ahead, wherein when said cache memory unit reads data from a prescribed region of said cache memory in accordance with a data read request with respect to said external memory, said external memory interface reads ahead data from said external memory in accordance with the degree of said read-ahead stored in said register.

11. An external memory control device for use in a data driven type information processing apparatus performing processing while storing a copy of a portion of data stored in an external memory in a cache memory, comprising:

an external memory interface regularly reading ahead data from said external memory at a prescribed timing; and a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory, and wherein when said cache memory unit writes data to the last word of a page of said cache memory in accordance with a data write request with respect to said external memory, said external memory interface stores data stored in said page of said cache memory back into said external memory.

12. An external memory control device for use in a data driven type information processing apparatus performing processing while storing a copy of a portion of data stored in an external memory in a cache memory, comprising:

an external memory interface regularly reading ahead data from said external memory at a prescribed timing; and a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory, and wherein said cache memory unit, when writing data to a prescribed region of said cache memory in accordance with a data write request with respect to said external memory, generates a first packet including a storeback request to send to said external memory interface, said external memory interface generates a plurality of second packets each including a code indicating cache read in accordance with said storeback request, to send to said cache memory unit, said cache memory unit generates a plurality of third packets each including data read from said cache memory in accordance with said cache read, to send to said external memory interface, and said external memory interface stores the data included in said third packets back into said external memory.

13. An external memory control device for use in a data driven type information processing apparatus performing processing while storing a copy of a portion of data stored in an external memory in a cache memory, comprising:

an external memory interface regularly reading ahead data from said external memory at a prescribed timing; and a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory, and wherein said cache memory has two sets of data read line and data write line, and said cache memory unit includes a first cache memory access control unit which accesses said cache memory using one of said two sets of data read line and data write line in accordance with the data access request with respect to said external memory, and a second cache memory access control unit which regularly reads ahead data from said external memory at the prescribed timing, and stores said read ahead data in said cache memory using the other of said two sets of data read line and data write line.

14. An external memory control device for use in a data driven type information processing apparatus performing processing while storing a copy of a portion of data stored in an external memory in a cache memory, comprising:

an external memory interface regularly reading ahead data from said external memory at a prescribed timing; and a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory, and wherein said cache memory has a set of data read line and data write line, and said cache memory unit includes a first cache memory access control unit which accesses said cache memory using said set of data read line and data write line in accordance with the data access request with respect to said external memory, a second cache memory access control unit which regularly reads ahead data from said external memory at the prescribed timing, and stores said read ahead data in said cache memory using said set of data read line and data write line, a select unit which switches said set of data read line and data write line to connect to one of said first cache memory access control unit and said second cache memory access control unit, and a register holding information indicating the switching of said select unit.

15. An external memory control device for use in a data driven type information processing apparatus performing processing while storing a copy of a portion of data stored in an external memory in a cache memory, comprising:

an external memory interface regularly reading ahead data from said external memory at a prescribed timing; and a cache memory unit storing the data read ahead by said external memory interface in said cache memory and performing data access to said cache memory in accordance with a data access request to said external memory, wherein when said cache memory unit reads data from a prescribed region of said cache memory in accordance with a data read request with respect to said external memory, said external memory interface reads ahead data from said external memory, and wherein said cache memory unit operates asynchronously and in an autonomous and distributed manner, said external memory interface performs burst access with respect to said external memory in synchronization with a base clock of said external memory, and said cache memory unit and said external memory interface operate asynchronously from, independently from, and in parallel with each other.

16. A data driven type information processing apparatus performing processing while storing a copy of a portion of data stored in an external memory in cache memories, comprising:

a main router selectively sending out a first packet;

a plurality of processing cores each performing an operation in accordance with the first packet selectively sent out from said main router and sending out a second packet including an upload request at a prescribed timing;

a plurality of external memory interfaces each receiving said upload request and regularly reading ahead data from said external memory; and a router selectively sending said second packets sent out from said plurality of processing cores to said plurality of external memory interfaces;

wherein each of said processing cores stores the data read ahead by a corresponding external memory interface in a corresponding cache memory, and accesses said corresponding cache memory in accordance with a data access request to said external memory included in said first packet.

* * * * *